United States Patent [19]

Foley

[11] 4,283,538

[45] Aug. 11, 1981

[54] NOVEL TRIARYLMETHANE COMPOUNDS

[75] Inventor: James W. Foley, Andover, Mass.

[73] Assignee: Polaroid Corporation, Cambridge, Mass.

[21] Appl. No.: 106,904

[22] Filed: Dec. 26, 1979

[51] Int. Cl.³ .................. C07D 455/04; C07C 143/80
[52] U.S. Cl. ................................ 546/94; 260/325 R;
 260/326.34; 260/326.41; 260/338; 260/465 D;
 260/501.12; 260/507 R; 430/520; 544/58.1;
 544/58.5; 544/62; 544/135; 544/144; 544/159;
 544/368; 544/373; 544/393; 546/198; 546/200;
 546/230; 546/234; 548/207; 560/10; 560/12;
 560/13; 562/427; 562/430; 564/88
[58] Field of Search .................... 430/520; 560/12, 10,
 560/13; 260/556 AR, 556 B, 507 R, 465 D, 325
 R, 338, 501.12, 326.41, 326.34; 562/430, 427;
 544/58.1, 58.5, 144, 159, 373, 393; 546/94, 230,
 200, 234

[56] References Cited

U.S. PATENT DOCUMENTS

| | | | |
|---|---|---|---|
| 1,879,537 | 9/1932 | Schneider ............................. | 430/520 |
| 1,994,876 | 3/1935 | Schneider et al. .................... | 430/520 |
| 2,147,112 | 2/1939 | Schneider ............................. | 430/520 |
| 2,150,695 | 3/1939 | Muehler ................................ | 430/520 |
| 2,282,890 | 5/1942 | Schneider et al. .................... | 430/520 |
| 2,350,090 | 5/1944 | Beilenson ............................. | 430/520 |
| 3,406,069 | 10/1968 | Overman .............................. | 430/520 |
| 3,615,548 | 10/1971 | Firestine ........................... | 430/520 X |
| 3,723,116 | 3/1973 | Kinjo et al. ............................. | 430/80 |
| 3,726,682 | 4/1973 | Van Paesschen ................ | 430/520 X |
| 4,012,376 | 3/1977 | Wright .............................. | 546/94 X |
| 4,139,381 | 2/1979 | Bloom et al. ......................... | 430/520 |
| 4,140,689 | 2/1979 | Foley et al. ............................ | 546/94 |
| 4,178,446 | 12/1979 | Bloom et al. .......................... | 544/33 |
| 4,204,061 | 5/1980 | Bloom et al. ....................... | 546/94 X |

Primary Examiner—Richard A. Schwartz
Attorney, Agent, or Firm—Sybil A. Campbell

[57] ABSTRACT

In one embodiment, the present invention is concerned with novel triarylmethane compounds possessing in their triaryl structure a 4′-oxo-1′-naphthylidene (or a 4′-oxo-1′-phenylidene) moiety and a phenyl moiety substituted in the ortho-position to the central carbon atom with the group

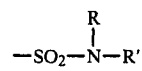

wherein R is an alkyl group or a phenyl group, unsubstituted or substituted with a solubilizing group; R' is selected from

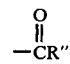

wherein R'' is methyl, unsubstituted or substituted with one or two halo groups or substituted with a phenyl, alkoxy or phenoxy group and

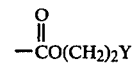

wherein Y is an electron-withdrawing group; and R and R' taken with said

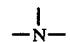

represents

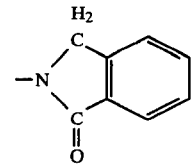

In another embodiment the present invention is concerned with a method of synthesizing the aforementioned compounds by reacting, e.g., a 2-R'-3-(4'-hydroxy-1'-phenyl/naphthyl)-3-(phenyl/naphthyl)-2,3-dihydrobenz[d]isothiazole-1,1-dioxide with an alkylation reagent in the presence of base.

23 Claims, No Drawings

NOVEL TRIARYLMETHANE COMPOUNDS

BACKGROUND OF THE INVENTION

1. Field of the Invention

This invention relates to novel chemical compounds, and more particularly, it relates to novel triarylmethane compounds which are useful, e.g., as light-screening dyes in photographic products and processes.

2. Description of the Prior Art

It is well known that photographic film, and especially multicolor films, may and generally do vary from lot to lot, notwithstanding efforts to "repeat" previous films. Manufacturers of multicolor photographic films have developed a number of procedures to minimize the effects upon the final multicolor image of unavoidable variations in the manufacturing operations. These variations are reflected primarily in shifts in color balance as reflected in mismatching of the D log E curves of the individual red, green and blue exposures. Equipment used to coat multicolor films is highly precise but variations between intended coverage of silver halide and/or the dye image-forming materials do occur. Repeat batches of silver halide emulsions may, and usually do, vary in their photographic response. Individual layers may be dried to slightly different degrees. Films are stored for a period of time after coating to allow the films to "age", so that changes in sensitometry following coating have an opportunity to reach a plateau prior to sale. If the film is designed to be developed by a photofinisher or in a darkroom, processing of the exposed multicolor film is controlled within very narrow limits, typically within plus or minus a half degree of a prescribed temperature, in order to minimize sensitometric variations from film to film. Where the multicolor film is of the negative type, an opportunity to adjust the sensitometry occurs in printing the desired final positive image, during which operation the printing exposure may be appropriately color filtered.

The basic sources of sensitometric variations noted above exist also in multicolor diffusion transfer films, with the added complication that once the film is shipped, the sensitometric properties are essentially fixed. The opportunity for adjustment provided in darkroom processing, practically speaking, is unavailable for users of self-developing films. While professional and advanced amateur photographers may be skillful enough to utilize color correction filters to at least partially "rebalance" the color balance, ordinary users of the film would only be confused by such additional operations.

It is well known to use light-screening dyes in photographic elements. Such a dye may be incorporated as a filter dye in a light-sensitive emulsion layer(s) or in a layer coated over one or more light-sensitive emulsion layers or between two differently color-sensitized emulsion layers to modify the light record in the emulsion layer or to control the spectral composition of light falling on the underlying light-sensitive layer, or it may be incorporated as an antihalation dye in a non-light-sensitive layer positioned on either side of a support carrying the light-sensitive layer(s).

The dyes employed for these purposes, in addition to having the requisite spectral absorption characteristics for their intended use, should not have any adverse effect on the properties of the light-sensitive emulsion layer(s), and also, should be capable of being decolorized or removed during photographic processing so as not to leave stain in the processed photographic element. In photographic processes where the dye is removed by being dissolved in a processing solution, it is usually preferred that the dye also decolorize in order to avoid contamination of the processing solution and to prevent staining from residual dye in the processed light-sensitive element.

Though various classes of dyes have been proposed for use in antihalation and color correction filter layers, the dyes heretofore employed have not been altogether satisfactory. Some of the dyes tend to reduce sensitivity, fog or exert other adverse effect on the light-sensitive material. However, the major drawback of previously employed dyes is their tendency to cause stain due to incomplete decolorization or reversal of some of the decolorized form to the original colored form. For example, some classes of dyes rely on the presence of a reagent, such as, a sulfite for "bleaching", i.e., decolorization and unless the dyes are removed from the light-sensitive material during or after processing, their color may reappear in time.

Among the classes of light-screening dyes used previously are the triarylmethanes. For example, U.S. Pat. Nos. 1,879,537; 1,994,876; 2,350,090 and 3,005,771 disclose the use of fuchsone-type dyes in antihalation layers, and U.S. Pat. Nos. 3,406,069 and 3,615,548 are concerned with the metal chelates of fuchsone dyes as antihalation dyes. These and other types of triarylmethane dyes suffer from one or more of the drawbacks discussed above, and in particular, prior dyes of this type have been difficult to keep decolorized at the pH's normally encountered during processing subsequent to "bleaching" and in the final product.

U.S. Pat. No. 4,139,381 to Stanley M. Bloom, Alan L. Borror and James W. Foley is directed to the use of certain 3,3-disubstituted sulfam(na)phthaleins as photographic optical filter agents and filter agent precursors. As described therein, one of the 3-substituents is a 4'-hydroxy-1'-phenyl moiety or a 4'-hydroxy-1'-naphthyl moiety, the other of the 3-substituents is a phenyl moiety or a naphthyl moiety, and the N atom of the sulfam(na)phthalein ring is substituted with a carbonyl moiety that undergoes an irreversible cleavage reaction in alkaline solution. These compounds are initially colorless, i.e., they do not absorb visible radiation intended to expose the photosensitive material but upon contact with base form a colored compound capable of absorbing such radiation thereby preventing further exposure of said photosensitive materials by ambient light, which colored compound after remaining in contact with said base for a given time forms a colorless compound as a result of the irreversible cleavage of the carbonyl moiety.

Copending U.S. patent application Ser. No. 957,161 of James W. Foley filed Nov. 2, 1978, and copending U.S. patent application Ser. No. 836,067 of Alan L. Borror et al filed Sept. 23, 1977, also are concerned with N-carbonyl-3,3-disubstituted sulfam(na)phthaleins. The sulfam(na)phthaleins disclosed in these applications are initially colored, and when contacted with base, they are converted to a form having a different color, which form decolorizes by undergoing an irreversible cleavage reaction after remaining in contact with said base for a given time. U.S. patent application Ser. Nos. 106,902 and 106,901 filed concurrently herewith disclose xanthene dyes which also decolorize by irreversible cleavage in base, and like the initially colored sulfam(na)phthaleins, offer advantages over prior light-screening dyes because of their ability to decolorize completely and irreversibly to a substantially inert colorless product.

The present invention is concerned with another class of compounds which also find utility as photographic light-screening dyes and which also are free from the deficiencies associated with the dyes previously used for this purpose. The subject triarylmethane dyes, which will be defined with greater particularity hereinafter, are efficient absorbers of radiation within a predetermined range in the visible range of 400 to 700 nm, may be incorporated in gelatin or other processing composition-permeable colloidal binding agents and are decolorized at an alkaline pH to yield a colorless product. Because of their ability to decolorize completely and irreversibly in base without requiring an additional reagent, such as, a sulfite for the "bleaching" reaction and because the new colorless product produced upon irreversible cleavage remains colorless in aqueous solution over a pH range of 1 to 14, the cleavage product may be retained in the photographic light-sensitive element without the possibility of color reappearing in time. Besides being non-staining, the compounds usually are substantially inert with respect to the light-sensitive material and thus, may be positioned in a layer adjacent to a silver halide emulsion layer or directly incorporated into an emulsion layer without having any adverse effect on the properties of the emulsion.

SUMMARY OF THE INVENTION

It is therefore the primary object of the present invention to provide novel triarylmethane compounds.

It is another object of the present invention to provide triarylmethane compounds useful as light-screening dyes in photographic products and processes.

It is a further object of the present invention to provide a method of synthesizing the said triarylmethane compounds.

Other objects of this invention will in part be obvious and will in part appear hereinafter.

This invention accordingly comprises the process involving the several steps and the relation and order of one or more of such steps with respect to each of the others and the product processing the features, properties and the relation of elements which are exemplified in the following detailed disclosure and the scope of the application of which will be indicated in the claims.

According to the present invention, novel triarylmethane compounds are provided which possess in their triaryl structure a 4'-oxo-1'-naphthylidene (or a 4'-oxo-1'-phenylidene) moiety and a phenyl moiety substituted in the ortho-position to the central carbon atom with the sulfonamido group,

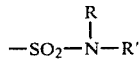

wherein R is an alkyl group or a phenyl group, unsubstituted or substituted with a solubilizing group; R' is selected from

wherein R" is methyl, unsubstituted or substituted with one or two halo groups or substituted with an alkoxy, phenoxy or phenyl group, and

wherein Y is an electron-withdrawing group; and R and R' taken with said

of said

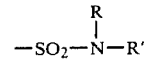

group represents

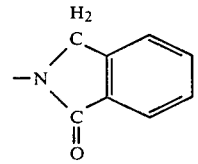

In another embodiment of the present invention, it has been found that the aforementioned compounds may be prepared by reacting, e.g., the appropriate 2-R'-3-(4'-hydroxy-1'-phenyl/naphthyl)-3-(phenyl/naphthyl)-2,3-dihydrobenz[d]isothiazole-1,1-dioxide with the selected alkylation reagent in the presence of base. Because the R' substituent of the starting material and especially said ortho-substituent in the product undergoes irreversible cleavage in alkaline solution and because o-sulfonamides are not as readily alkylated as p-sulfonamides, it is indeed surprising that the isothiazole ring can be opened and reacted with said alkylation reagent in its open form to give the desired N-substituted product.

For a fuller understanding of the nature and objects of the present invention, reference should be had to the following detailed description.

DETAILED DESCRIPTION OF THE INVENTION

The novel compounds provided by the present invention may be represented by the formula

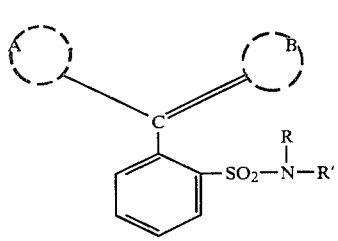

(I)

wherein A is a phenyl moiety or a naphthyl moiety; B is a 4'-oxo-1'-phenylidene moiety or a 4'-oxo-1'-naphthylidene moiety; R is an alkyl group or a phenyl group, unsubstituted or substituted with a solubilizing group; R' is selected from

wherein R″ is methyl, unsubstituted or substituted with one or two halo groups or substituted with a phenyl, alkoxy or phenoxy group and

wherein Y is an electron-withdrawing group and R and R′ taken with said

represents

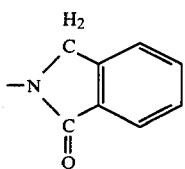

By "electron-withdrawing group" is meant a group having a positive sigma value as defined by Hammett's Equation.

As noted above, the subject compounds are initially colored, i.e., capable of absorbing visible radiation, and at an alkaline pH, are converted to a colorless product by undergoing an irreversible cleavage reaction with base. The colorless product formed is a new compound which is different from and non-reversible to the colored compound by a change in pH. In particular, it is the

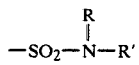

group substituted on the phenyl moiety in a position ortho to the central carbon atom that undergoes the irreversible cleavage reaction in alkaline solution that is complete within a predetermined time at a predetermined alkaline pH to give the new colorless compound, namely, the cyclic sulfonamide, as illustrated by the following wherein the A moiety is a 4′-hydroxyphenyl and the B moiety is a 4′-oxo-phenylidene and R and R′ are taken separately.

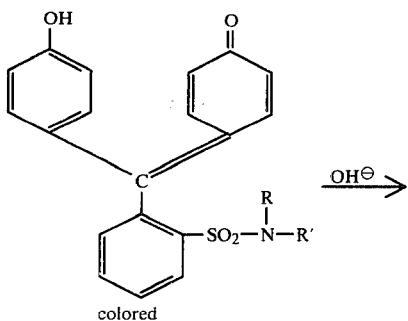

colored

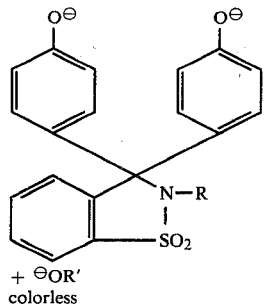

+ ⊖OR′
colorless

It will be appreciated that the by-products formed upon cleavage of the group also are colorless. Because the said cleavage reaction proceeds at a faster rate at higher pH's, the subject compounds are particularly suitable for use in photographic processes where the pH is maintained above about 10 at least for the time necessary for decolorization to the corresponding cyclic sulfonamide.

It will be understood that the A moiety and/or the B moiety of the compounds represented in formula I above may contain one or more substituents in addition to those specified, which substituents should not interfere with the intended use of the compounds.

Typical substituents include branched or straight chain alkyl, such as, methyl, ethyl, isopropyl, n-butyl, n-propyl, t-butyl, hexyl, octyl, dodecyl, hexadecyl, octadecyl and eicosanyl; aryl, such as phenyl and naphthyl; alkaryl and aralkyl, preferably, alkyl-substituted phenyl and phenyl-substituted alkyl, such as p-ethylphenyl, p-octylphenyl, p-dodecylphenyl, benzyl, phenethyl, phenylhexyl and phenyldodecyl; alkoxy, such as, methoxy, ethoxy, butoxy, octadecyloxy, 1-ethoxy-2-(β-ethoxyethoxy); aryloxy, such as, phenoxy, benzyloxy and naphthoxy; alkoxyalkyl, such as, methoxymethyl, ethoxymethyl, and dodecyloxyethyl; halo, such as, fluoro, bromo and chloro; trihalomethyl; such as, trifluoromethyl and trichloromethyl; sulfonamido (—NH—SO$_2$R° wherein R° is alkyl, aryl, alkaryl or aralkyl); sulfamoyl (—SO$_2$—NH—R° wherein R° has the same meaning given above); acyl

wherein R° has the meaning given above); sulfonyl (—SO$_2$—R° wherein R° has the same meaning given above); sulfo; cyano; carboxy; hydroxy; amino including mono- and disubstituted amino (–NR′R″ wherein R′ and R″ each are hydrogen, alkyl, aryl, alkaryl or aralkyl) and R′ and R″ taken together represent the atoms necessary to complete a heterocyclic ring, such as piperidino, pyrrolidino, N-lower alkylpiperazino, morpholino, thiomorpholino and tetrahydro-2H,4H-1,3,6-dioxazocino or a fused ring system, e.g., quinolizidine) and perhalomethylcarbinol,

wherein $R^I$ is perhalomethyl, e.g., trifluoromethyl, difluoromethyl, difluorochloromethyl, dichlorofluoromethyl, dichloromethyl and trichloromethyl and R" is hydrogen or said perhalomethyl, usually the same as R'.

Typical of the triarylmethane compounds of the present invention are those represented by the following formula

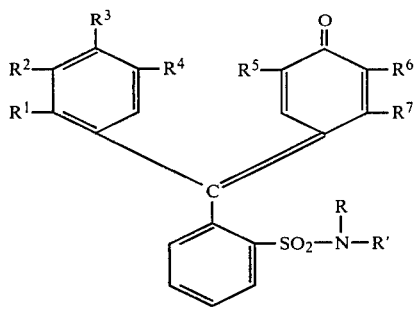

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen; alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^2$, $R^3$ and $R^4$ taken together represent the atoms necessary to complete a fused [ij]-quinolizidine ring; $R^5$ is hydrogen, alkyl, phenyl, alkoxy, chloro, fluoro or perhalomethylcarbinol; $R^6$ is hydrogen, alkyl, alkoxy, chloro or fluoro; $R^7$ is hydrogen, alkyl, alkoxy or hydroxy; $R^6$ and $R^7$ taken together represent the carbon atoms necessary to complete a fused benzene ring; R is an alkyl group or a phenyl group, unsubstituted or substituted with a solubilizing group; R' is selected from

wherein R" is methyl, unsubstituted or substituted with one or two halo groups or substituted with a phenyl, alkoxy or phenoxy group, and

wherein Y is an electron-withdrawing group; and R and R' taken with said

represents

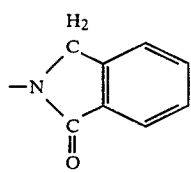

By "solubilizing group" is meant a group that enhances the solubility of the compound in aqueous alkaline photographic processing solutions. Preferably, said solubilizing groups are —SO$_3$H, —COOH or —OH and said R is an alkyl group having 1 to 4 carbon atoms. When R" is substituted, the halo group(s) preferably is selected from chloro, bromo and fluoro, and when substituted with two halo groups, they are preferably the same. When substituted with alkoxy, the alkoxy preferably has 1 to 4 carbon atoms. The electron-withdrawing group, Y, preferably has a positive sigma value ($\rho^-$) greater than 0.6. Preferred electron-withdrawing groups include nitro; cyano; —SO$_2$CH$_3$;

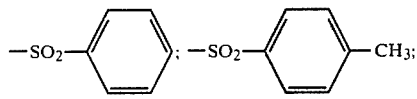

—COCH$_3$; and —SO$_2$N(CH$_2$Ph)$_2$. The sigma value for these and other groups, such as, —CHO, —COOH, —COOC$_2$H$_5$ and —CONH$_2$ have been reported by Eugen Müller, Methoden der Organischen Chemie, Georg Thieme Verlag, Stuttgart, 1970, p. 78 in terms of $\rho^-$ values based on the ionization of p-substituted phenols.

Usually, the alkyl and alkoxy substituents comprising $R^1$, $R^2$, $R^3$, $R^4$, $R^5$, $R^6$ and $R^7$ are lower alkyl having 1 to 4 carbon atoms, such as, methyl, ethyl, n-propyl, isopropyl and n-butyl and lower alkoxy having 1 to 4 carbon atoms, such as, methoxy, ethoxy, propoxy and butoxy. Also, the alkyl groups of the -N,N-(dialkyl)amino and -N,N-(w-$R^8$alkyl)$_2$-amino substituents usually are lower alkyl having 1 to 4 carbon atoms and $R^8$, when halo, is preferably chloro.

In preparing the subject compounds according to the method of the present invention, a 3,3-disubstituted-2,3-dihydrobenz[d]isothiazole-1,1-dioxide of the formula

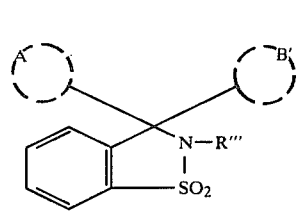

wherein A is a phenyl moiety or a naphthyl moiety; B' is a 4'-hydroxy-1'-phenyl moiety or a 4'-hydroxy-1'-naphthyl moiety; and R''' is selected from

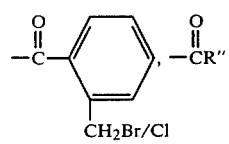

wherein R" is methyl, unsubstituted or substituted with one or two halo groups or substituted with a phenyl, alkoxy or phenoxy group, and

wherein Y is an electron-withdrawing group is reacted, when R''' is

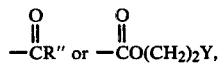

with an alkylation reagent in the presence of base in a concentration sufficient to open said 2,3-dihydrobenz[d]isothiazole-1,1-dioxide ring without substantial cleavage of said

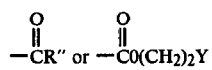

group to give the compound of the formula

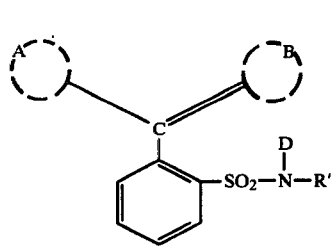

wherein B is a 4'-oxo-1'-phenylidene moiety or a 4'-oxo-1'-naphthylidene moiety; A has the same meaning given above; D is an alkyl group, unsubstituted or substituted with a solubilizing group; R' is selected from

and

wherein R" and Y have the same meaning given above and when R'" is

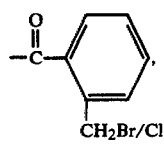

treating said (a) with base in a concentration sufficient to give the following compound without substantial cleavage of said

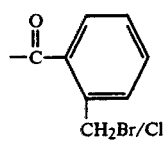

group

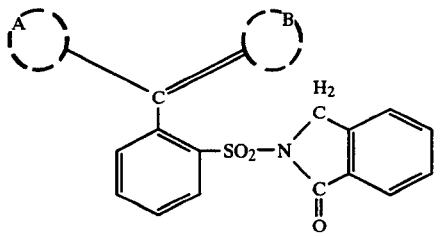

In a preferred embodiment, the subject method comprises (i) reacting a 3,3-disubstituted-2,3-dihydrobenz[d]isothiazole-1,1-dioxide of the formula

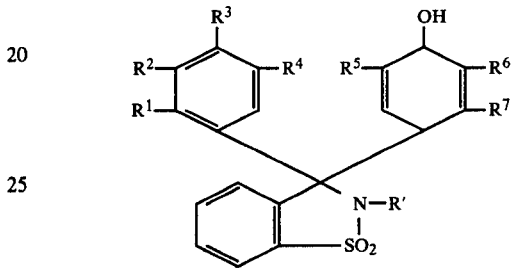

wherein $R^1$ is hydrogen, alkyl, alkoxy, hydroxy or -OP wherein P is a protecting group; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen, alkyl, alkoxy, hydroxy, -OP wherein P is a protecting group, -N,N-(dialkyl)-amino, -N,N-(w-$R^8$-alkyl)$_2$amino wherein $R^8$ is halo, hydroxy or -OP wherein P is a protecting group; piperidino, pyrrolidino, N-methylpiperazino, morpholino, thiomorpholino or tetrahydro-2H,4H-1,3,6-dioxazocino; $R^2$, $R^3$ and $R^4$ taken together represent the atoms necessary to complete a fused [ij]quinolizidine ring; $R^5$ is hydrogen, phenyl, alkyl, alkoxy, chloro, fluoro or perhalomethylcarbinol; $R^6$ is hydrogen, alkyl, alkoxy, chloro or fluoro; $R^7$ is hydrogen, alkyl, alkoxy, hydroxy or -OP wherein P is a protecting group; $R^6$ and $R^7$ taken together represent the carbon atoms necessary to complete a fused benzene ring; R' is selected from

wherein R" is methyl, unsubstituted or substituted with one or two halo groups or substituted with a phenyl, alkoxy or phenoxy group, and

wherein Y is an electron-withdrawing group and an alkylation reagent in the presence of base in a concentration sufficient to open said 2,3-dihydrobenz[d]isothiazole-1,1-dioxide ring without substantial cleavage of said

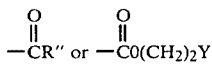

group to give the compound having the formula

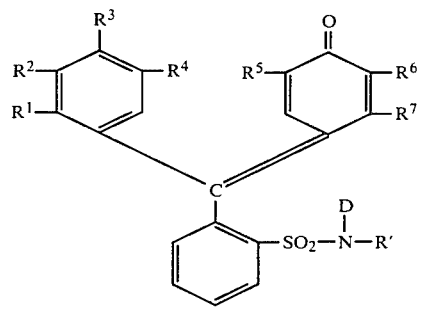

wherein $R^1$, $R^2$, $R^3$, $R^4$, $R^5$, $R^6$ and $R^7$ have the same meaning given above; D is an alkyl group, unsubstituted or substituted with a solubilizing group; R' is selected from

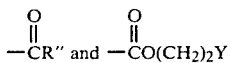

wherein R" and Y have the same meaning given above; or (ii) treating a 3,3-disubstituted-2,3-dihydrobenz[d]isothiazole-1,1-dioxide of the formula

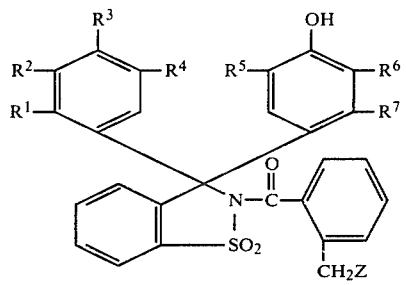

wherein Z is chloro or bromo and $R^1$, $R^2$, $R^3$, $R^4$, $R^5$, $R^6$ and $R^7$ have the same meaning given above with base in a concentration sufficient to open said 2,3-dihydrobenz[d]isothiazole-1,1-dioxide ring without substantial cleavage of said

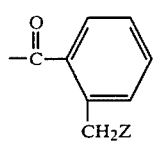

group to give the compound of the formula

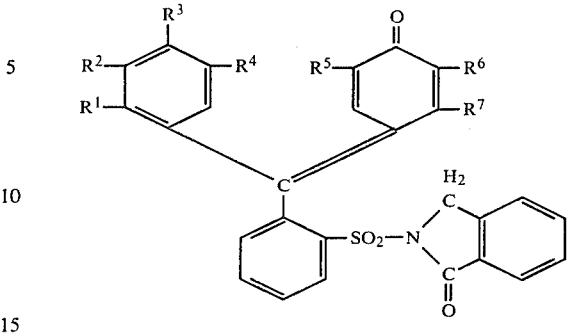

wherein $R^1$, $R^2$, $R^3$, $R^4$, $R^5$, $R^6$ and $R^7$ have the same meaning given above, and where appropriate, removing said protecting group(s) with weak acid.

Specific examples of compounds that may be synthesized according to the subject method and within the scope of the present invention are as follows.

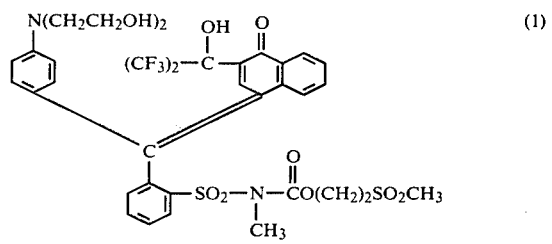

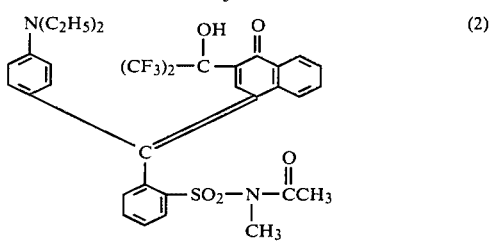

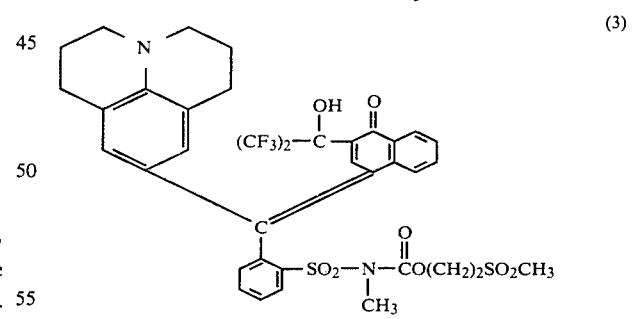

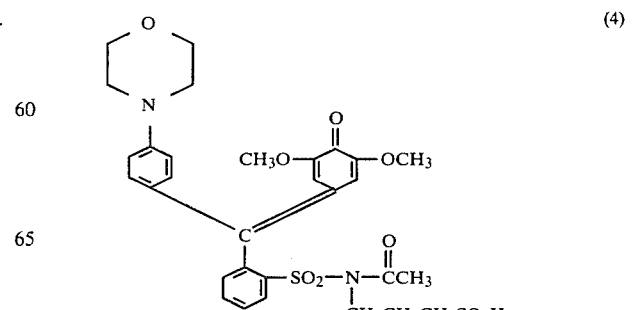

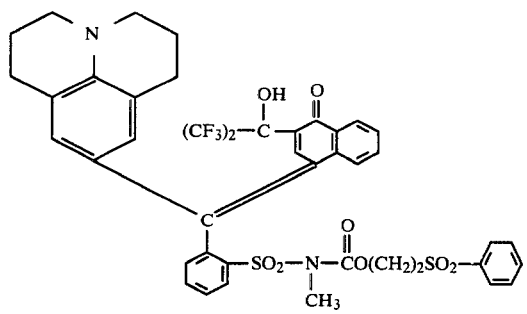
(5)
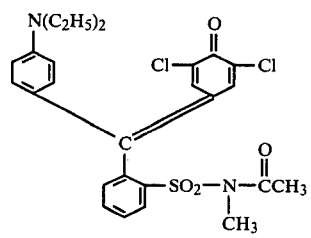
(11)
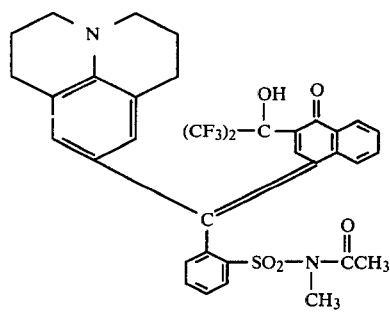
(6)
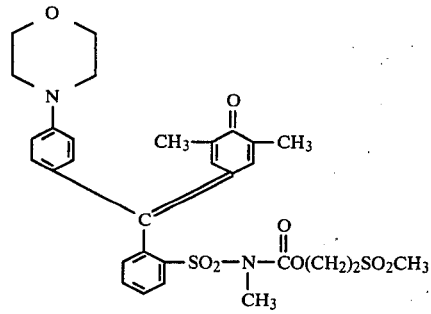
(12)
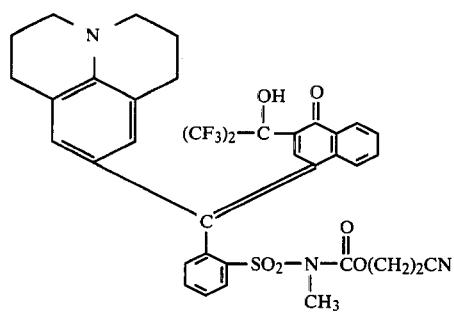
(7)
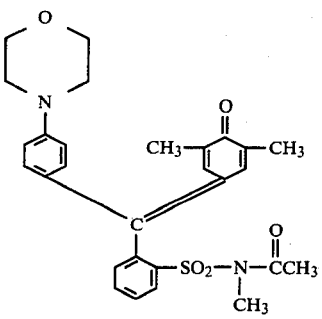
(13)
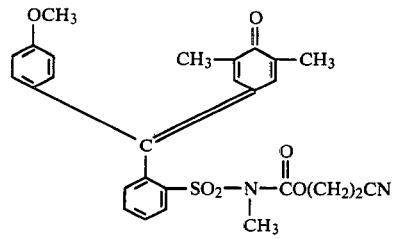
(8)
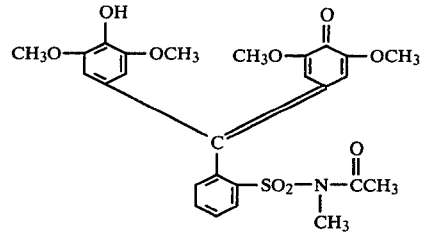
(14)
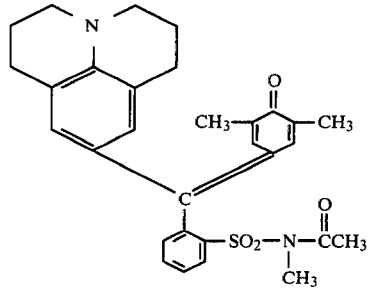
(9)
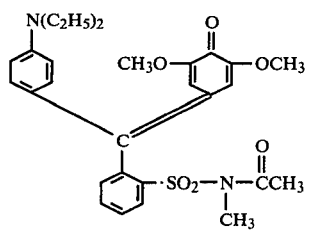
(15)
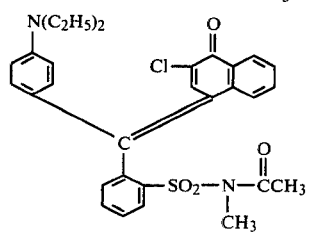
(10)
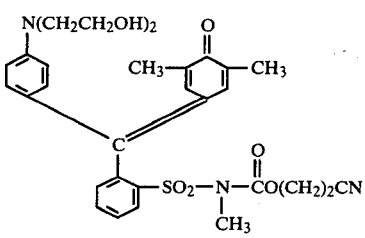
(16)

-continued
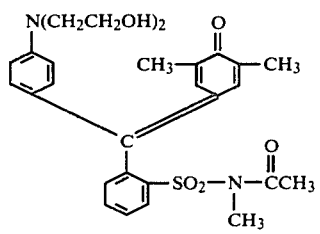 (17)
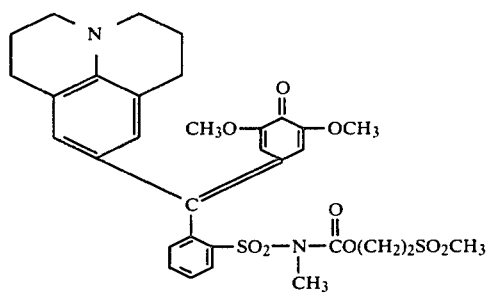 (18)
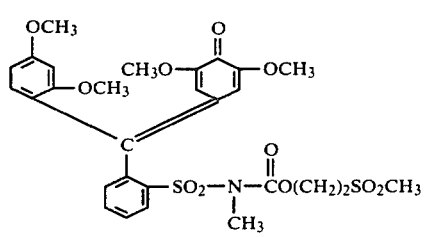 (19)
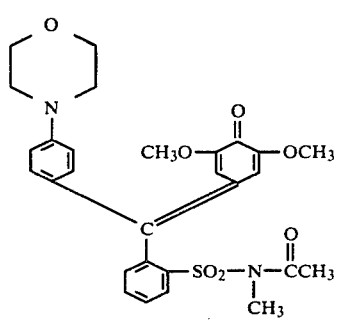 (20)
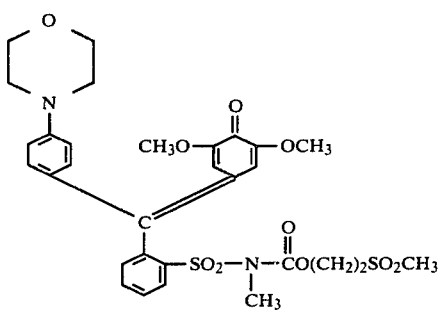 (21)
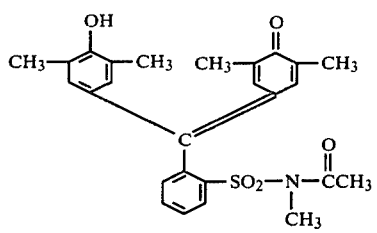 (22)
-continued
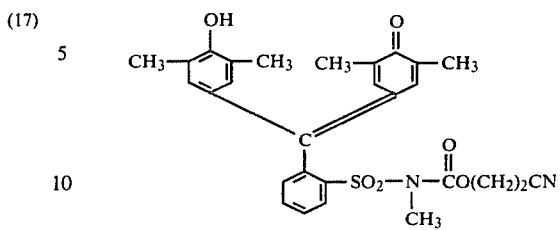 (23)
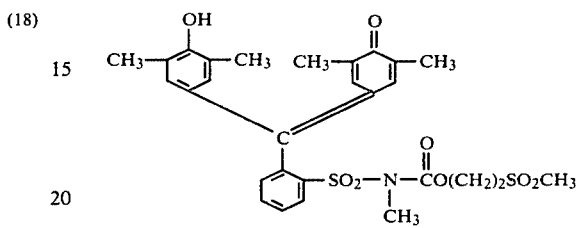 (24)
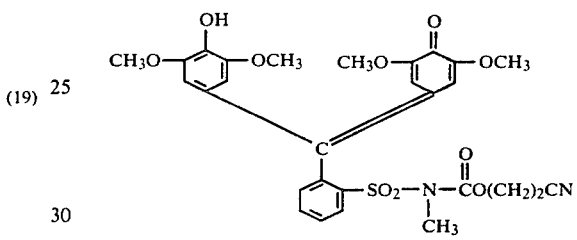 (25)
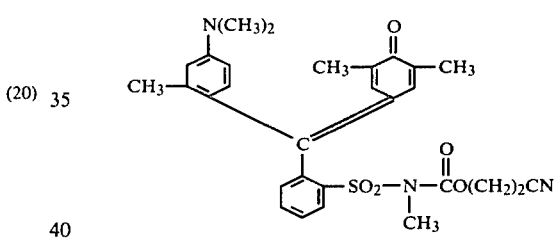 (26)
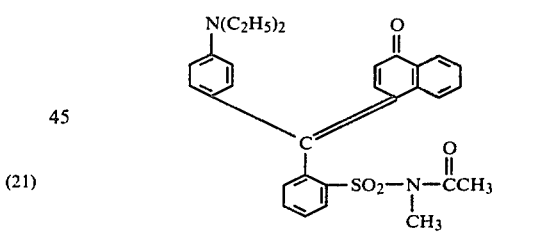 (27)
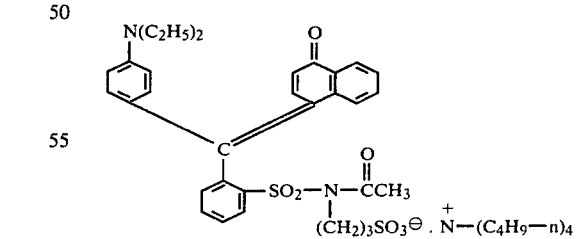 (28)
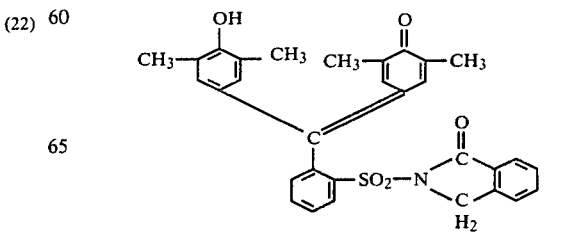 (29)

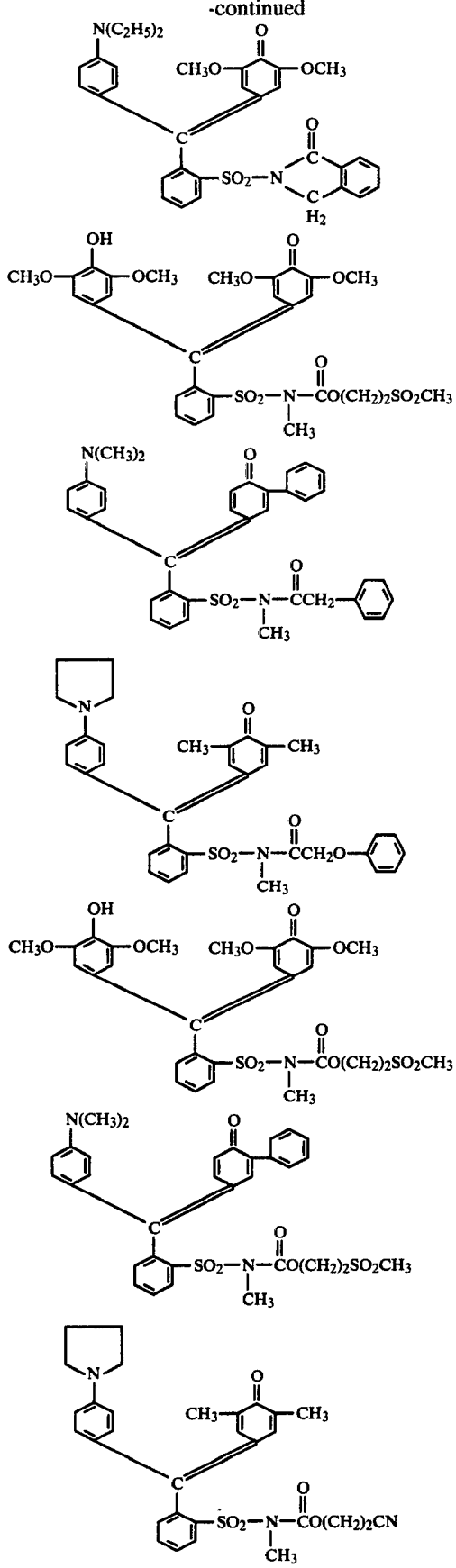

In carrying out the method of the present invention, the 2-R'-3,3-disubstituted-2,3-dihydrobenz[d]isothiazole-1,1-dioxide starting material and the selected alkylation reagent may be reacted in an inert organic solvent, for example, tetrahydrofuran, acetone, dimethyl sulfoxide or N,N-dimethylformamide, or they may be reacted in a two-phase system comprising an aqueous phase and an organic phase of, for example, a polar organic solvent such as dichloromethane preferably employing a quaternary ammonium salt as phase-transfer catalyst. The reactants may be used in equivalent amounts, or the alkylation reagent may be used in an excess of up to about 10 equivalents per equivalent of isothiazole.

Because the

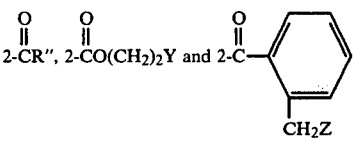

substituents of the isothiazole starting material, and especially the

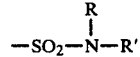

substituent of the product, undergo irreversible cleavage quite rapidly in alkaline solution especially at higher pH's, it is important that the concentration of base employed in the subject method should be sufficient for opening the isothiazole ring to permit N-substitution but should not be high enough to destroy the starting material (or the desired product) by initiating any substantial cleavage of said 2-substituents. Where the N-alkylation reaction is conducted in a two-phase system, the pH for achieving the desired results is usually about 10. Where the reaction is conducted in an inert organic solvent, about one equivalent of base is used with one equivalent of isothiazole. It will be appreciated that the specific amount may vary somewhat depending upon the starting material and that the appropriate concentration of base may be readily determined empirically.

The order of adding the reactants is not critical, but it will be apparent that where large batches are involved or the addition may be interrupted, the base should be added last to prevent loss of the starting material due to the irreversible cleavage reaction upon standing. Where the reaction product is sensitive to light, it may be desirable to conduct the reaction in the dark. Though not essential, it also may be desirable to conduct the reaction under an inert atmosphere, for example, nitrogen.

The reaction temperature may vary over a relatively wide range of about 0° to 50° C., and ordinarily, the reaction is conveniently carried out at room temperature.

When the two-phase system is employed, the quaternary ammonium salt may be any of those commonly used as phase-transfer catalysts and usually is a tetraalkylammonium bromide or chloride containing up to about 20 carbon atoms in each alkyl group, such as, n-tetrabutylammonium bromide, tetrahexylammonium chloride, ethylhexadecyldimethylammonium bromide, benzyltriethylammonium chloride, dodecyltrimethylammonium bromide and trioctylpropylammonium chloride.

The base may be a hydroxide, a hydride or carbonate, for example, potassium or sodium hydroxide, tetrabutylammonium hydroxide, sodium or potassium carbonate or sodium hydride.

The alkylation reagent employed may be a compound of the formula MD wherein M is halo and D is alkyl, unsubstituted or substituted with a solubilizing group. Because of their greater reactivity, the halo substituent is usually iodo, though it may be chloro or bromo. Other alkylation reagents also may be employed depending upon the particular N-substituted product desired. For example, 1,3-propane sultone or 1,4-butane sultone may be employed in the synthesis of N-alkylated products where the alkyl group is substituted with —SO$_3$H as the solubilizing group, and ethylene oxide may be used in the synthesis of N-alkylated products where the alkyl group is substituted with —OH as the solubilizing group. In the synthesis of N-alkylated products where —COOH is the solubilizing group, they may be prepared via an alkyl ester of the acid, e.g., I(CH$_2$)$_2$COOCH$_3$ followed by converting the ester of the N-alkylated compound to the free acid.

Besides these "external" alkylation reagents, the subject method also involves an internal alkylation. For example, in the preparation of the N-alkylated compounds where the sulfonamido moiety is

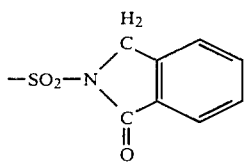

they are prepared by treating a

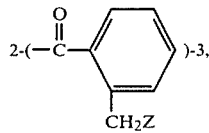

3-disubstituted-2,3-dihydrobenz[d]isothiazole-1,1-dioxide with base. In this instance, the —CH$_2$Z substituent ortho to the carbonyl of the

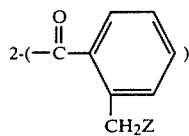

moiety functions as an "internal" alkylating agent to give the ring-closed product. It will be appreciated that other alkylation reagents known in the art may be substituted for those mentioned above where appropriate for obtaining the selected N-substituted product.

In synthesizing N-alkylated compounds from 2-R′-3,3-disubstituted-2,3-dihydrobenz[d]isothiazole-1,1-dioxides which contain two or more free hydroxy groups on the 3,3-substituents, it has been found that conducting the N-alkylation reaction in an aprotic solvent selected from dimethylsulfoxide or N,N-dimethylformamide in the presence of potassium hydroxide base gives a very substantial increase in yields. This method of synthesizing certain N-alkylated compounds from the aforementioned isothiazoles capable of multi-alkylations forms the subject matter of copending U.S. patent application Ser. No. (Case 6178) of Louis Cincotta.

The 2-substituted-3,3-disubstituted-2,3-dihydrobenz[d]isothiazole-1,1-dioxide starting materials wherein the 3,3-substituents may be the same or different may be synthesized by reacting one mole of a 3-(4′-OP-1′-phenyl/4′-OP-1′-naphthyl)-2,3-dihydrobenz[d]isothioazole-1,1-dioxide wherein P is a protecting group with about one to two moles of the selected carboxylic acid halide, for example, ClCOR″, ClCO$_2$(CH$_2$)$_2$Y or

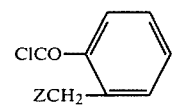

in pyridine at about 0° to 100° C. to yield the corresponding 2-carbonyl derivative followed by removing the protecting group with acid having a pH between about 0.1 to 5.0 at about 20° to 100° C. to give the corresponding 2-carbonyl-3-(4′-OH-1′-phenyl/4′-OH-1′-naphthyl)-3-(phenyl/naphthyl)-2,3-dihydrobenz[d]isothiazole-1,1-dioxide. Where the 3-(phenyl/naphthyl) substituent ultimately forming the A moiety of the starting material possesses a protected hydroxy group, e.g., —OP, or —N(CH$_2$CH$_2$OP)$_2$, it is unnecessary to remove the protecting group, but it may be deblocked to regenerate the free —OH or —N(CH$_2$CH$_2$OH)$_2$, if desired. The protecting group employed may be the same or different from the protecting group used for the 3-(4′-OP-phenyl/4′-OP-naphthyl) substituent. For example, different protecting groups may be selected that will permit deblocking of the 3-(4′-OP-1′-phenyl/4′-OP-1′-naphthyl) substituent, such as, a trimethylsilyl protecting group while leaving the protecting group on the hydroxy of the 3-(phenyl/naphthyl) substituent, such as, a methoxymethyl protecting group. The above method of N-acylating a 3,3-disubstituted-2,3-dihydrobenz[d]isothiazole-1,1-dioxide followed by removing the protecting groups forms the subject matter of copending U.S. patent application Ser. No. 836,010 of Stanley M. Bloom, Alan L. Borror and James W. Foley filed Sept. 23, 1977.

The acid used for the deblocking step may be an inorganic acid, such as, hydrochloric acid or sulfuric acid in a protic solvent, e.g., water, alkanol, such as, methanol or ethanol, or aqueous alkanol, or the acid may be an organic acid, such as, acetic acid or trifluoroacetic acid alone or in a protic solvent.

The carboxylic acid halide reactant may be prepared in a conventional manner, for example, by reacting the selected carboxylic acid, such as R″COOH, with phosphorus trichloride, phosphorus pentachloride or thionyl chloride to give the corresponding R″COCl, or by reacting the selected HO(CH$_2$)$_2$Y with phosgene to give the corresponding ClCO$_2$(CH$_2$)$_2$Y.

To prepare the 3-(4′-OP-1′-phenyl/4′-OP-1′-naphthyl)-3-(phenyl/naphthyl)-2,3-dihydrobenz[d]isothiazole-1,1-dioxides, a 3-(4′-OP-1′-phenyl/4′-OP-1′-naphthyl)benz[d]isothiazole-1,1-dioxide is reacted with at least one molar equivalent of a phenyllithium or a naphthyllithium reagent in an inert organic solvent, such as benzene, diethyl ether, dioxane, hexane, toluene, petroleum ether or tetrahydrofuran. The reaction temperature may vary over a relatively wide range from about −80° to 50° C. as may be readily determined for the particular reactants. For achieving maximum yields, the reaction generally is conducted at a temperature below about 0° C. and preferably between about −65° C. and −25° C. This method of preparing the 3-(4'-OP-1'-phenyl/4'-OP-1'-naphthyl)-3-(phenyl/naphthyl)-2,3-dihydrobenz[d]isothiazole-1,1-dioxides forms the subject matter of copending U.S. patent application Ser. No. 836,008 of Alan L. Borror, Louis Cincotta, James W. Foley and Marcis M. Kampe filed Sept. 23, 1977.

The 3-(4'-OP-1'-phenyl/4'-OP-1'-naphthyl)-benz[d]isothiazole-1,1-dioxides are prepared by blocking the functional hydroxy group and any substituent group(s), as may be appropriate, of the selected 4-halophenol or 4-halo-1-naphthol and converting the blocked phenol or 1-naphthol to the corresponding Grignard or lithium reagent which is then reacted with a saccharin reagent. The 4-halo substituent may be chloro, bromo or iodo when the lithium reagent is prepared by reacting the blocked phenol or blocked 1-naphthol with lithium metal and is either bromo or iodo when the lithium reagent is made via a lithium exchange reaction using, for example, n-butyllithium. In preparing the Grignard reagent by reacting the blocked phenol or 1-naphthol with magnesium metal, the 4-halo substituent may be chloro, bromo or iodo. The Grignard or lithium reagent thus prepared is then reacted with saccharin, the N-lithium salt of saccharin or saccharin pseudo-chloride to yield the corresponding 3-(4'-OP-1'-phenyl/4'-OP-1'-naphthyl)benz[d]isothiazole-1,1-dioxide. Generally, the Grignard reagent is reacted with the pseudo-chloride, and the lithium reagent is reacted with the N-lithium salt.

The groups selected for protecting the functional phenolic or naphtholic hydroxy group and other hydroxy groups that may be present in the phenol or 1-naphthol should be stable to and compatible with organolithium and Grignard reagents and should protect the hydroxy group(s) against reaction under the conditions encountered in the synthesis of the aforesaid compounds and in the subsequent N-acylation step. In addition, the protecting group selected should be capable of being easily removed under weakly acid conditions to regenerate the hydroxy group(s) without the removal of or adversely affecting the N-carbonyl moiety or other substituents that may be present. Alkyl groups, such as methyl and ethyl, may be employed in those instances where they can be removed without removal of the N-carbonyl moiety. Because they can be readily removed without disturbing the N-substituent or other substituents, the phenol or 1-naphthol preferably is protected with methoxymethyl, 2'-tetrahydropyranyl or dimethyl-t-butylsilyl. The blocked phenols and 1-naphthols employing these protecting groups may be prepared by methoxymethylation as described, for example, by Kaoru Fuji et al, *Synthesis*, 4, pp. 276–277 (1975), by tetrahydropyranylation as described, for example by William E. Parham et al, *J. Amer. Chem Soc.*, 70, pp. 4187–4189 (1948) or by silylating, e.g., with dimethyl-t-butylsilyl chloride in the presence of imidazole as described by E. J. Corey et al, *J. Amer. Chem. Soc.*, 94, pp. 6190–6191 (1972).

As noted above, hydroxy groups in addition to the functional —OH of the phenol and 1-naphthol may be blocked simultaneously with the functional hydroxy group, for example, by tetrahydropyranylation or methoxymethylation. Groups other than hydroxy that should be protected may be blocked prior to or subsequent to the blocking of the functional —OH. For example, carboxy group(s) may be protected by reacting a carboxy-substituted 4-halophenol (or 4-halo-1-naphthol) with 2-amino-2-dimethyl-1-propanol followed by blocking of the functional —OH. Sulfonamido (—NH—SO$_2$—R°) and sulfamoyl (—SO$_2$NH—R°) substituents may be protected by a t-butyl group.

The phenyl- or naphthyllithium reagent reacted with the 3-(4'-OP-phenyl/4'-OP-naphthyl)benz[d]isothiazole-1,1-dioxide and ultimately forming the A moiety of the starting materials may be substituted or unsubstituted and may be prepared from the corresponding halo-substituted compound. For example, N,N-dimethylaniline may be halogenated to give the 4-halo compound which, in turn, is reacted with lithium metal or n-butyllithium to yield the 4-lithium compound. Halogenation may be carried out in a conventional manner using either chlorine or bromine, with or without a catalyst, or using N-bromosuccinimide or iodinemonochloride. When lithium metal is employed in the preparation of the 4-lithium compound, the halo substituent may be chloro, bromo or iodo and is either bromo or iodo when a lithium exchange reaction is employed. If substituents, such as, hydroxy, are present, they should be blocked with the appropriate protecting group to render them compatible with organometallic reagents prior to conversion of the 4-lithium compound.

Where the 3,3-substituents of the 2-substituted-3,3-disubstituted-2,3-dihydrobenz[d]isothiazole-1,1-dioxide starting materials are different, they also may be prepared by reacting a 3-(phenyl/naphthyl)benz[d]isothiazole-1,1-dioxide, i.e., other than a 3-(phenyl/naphthyl)benz[d]isothiazole-1,1-dioxide containing a 4'-OP-substituent with at least an equivalent amount of a 4-OP-phenyllithium/4-OP-naphthyllithium reagent in an inert organic solvent preferably below about 0° C. to give the corresponding 3,3-disubstituted-2,3-dihydrobenz[d]isothiazole-1,1-dioxide followed by N-acylation and deblocking as described above. The 3-(phenyl/naphthyl)benz[d]isothiazole-1,1-dioxide may be prepared by blocking any substituent groups as may be appropriate of a halo-benzene or halo-naphthalene compound and converting the halo compound to the corresponding Grignard or lithium reagent which is then reacted with a saccharin reagent. The above method of synthesizing 3-(phenyl/naphthyl)-3-(4'-OP-1'-phenyl/4'-OP-1'-naphthyl)-2,3-dihydrobenz[d]isothiazole-1,1-dioxides forms the subject matter of copending U.S. patent application Ser. No. 836,025 of Alan L. Borror, James W. Foley, Marcis M. Kampe and John W. Lee, Jr. filed Sept. 23, 1977.

Where the 3,3-substituents of the 2-substituted-3,3-disubstituted-2,3-dihydrobenz[d]isothiazole-1,1-dioxide starting materials are the same, they also may be synthesized by reacting at least two equivalents of a 4-OP-phenyllithium/4-OP-naphthyllithium reagent with one equivalent of saccharin pseudo-chloride in an inert organic solvent preferably below 0° C. to give the corresponding 3,3-bis-(4'-OP-1'-phenyl/4'OP-1'-naphthyl)-2,3-dihydrobenz[d]isothiazole-1,1-dioxide. This bis compound is then reacted with an acid chloride and deblocked in the same manner discussed previously. The above synthesis of 3,3-bis(4'-OP-1'-phenyl/4'-OP-1'-naphthyl)-2,3-dihydrobenz[d]isothiazole-1,1-dioxides forms the subject matter of copending U.S. patent application Ser. No. 836,004 of Stanley M. Bloom, Alan L. Borror and James W. Foley filed Sept. 23, 1977.

A preferred method of synthesizing 2-substituted-3,3-disubstituted-2,3-dihydrobenz[d]isothiazole-1,1-dioxide starting materials wherein one of the 3,3-substituents is a 4'-OH-1'-phenyl/4'-OH-1'-naphthyl substituent possessing a perhalomethylcarbinol moiety comprises reacting a 3-substituted-benz[d]isothiazole-1,1-dioxide with at least two equivalents of a 4-OLi-phenyllithium/4-OLi-naphthyllithium reagent substituted with a

moiety in an inert organic solvent at $-80°$ to $50°$ C. to give the corresponding reaction product followed by hydrolyzing with acid at pH 6 to give the 3-(4'-OH-1'-phenyl/4'-OH-1'-naphthyl)-3-(substituted)-2,3-dihydrobenz[d]isothiazole-1,1-dioxide wherein said 3-(4'-OH-1'-phenyl/4'-OH-1'-naphthyl) substituent possesses a

moiety. This method of preparing the aforementioned perhalomethylcarbinol-substituted compounds from the "lithiated" perhalomethylcarbinol-substituted phenol (or 1-naphthol) forms the subject matter of copending U.S. patent application Ser. No. 956,908 of Louis Cincotta and James W. Foley filed Nov. 2, 1978.

The perhalomethylcarbinol-substituted compounds as prepared above may be reacted with 1 to 6 equivalents of an acid halide, $ClCO_2(CH_2)Y$, in pyridine at $0°$ to $100°$ C. in the presence of acidic alumina or a zeolite molecular sieve to give the corresponding 2-($-CO_2(CH_2)_2Y$)-3-(4'-OH-1'-phenyl/4'-OH—1'-naphthyl)-3-(substituted)-2,3-dihydrobenz[d]isothiazole-1,1-dioxide wherein said 3-(4'-OH-1'-phenyl/4'-OH-1'-naphthyl) substituent possesses a

moiety. This method of preparing said 2-($-CO_2(CH_2)_2Y$) compounds forms the subject matter of copending U.S. patent application Ser. No. 957,162 of Louis Cincotta and James W. Foley filed Nov. 2, 1978.

The perhalomethylcarbinol-substituted compounds as prepared from the "lithiated" perhalomethylcarbinol-substituted phenol (or 1-naphthol) also may be reacted with 3 to 6 equivalents of an acid halide, ClCOR'', in pyridine at $0°$ to $100°$ C. to give the corresponding triacylated compound 2-($-COR''$)-3-(4'—O—COR''-1'-phenyl/4'—O—COR''-1'-naphthyl)-2,3-dihydrobenz[d]isothiazole-1,1-dioxide wherein said (4'—O—COR''-1'-phenyl/naphthyl) substituent possesses a

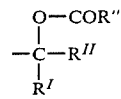

moiety followed by selectively removing the acyl groups only from the phenolic (or naphtholic) hydroxy group and the carbinol hydroxy group by treating with 0.01 to 2.0 N base between $0°$ and $40°$ C. The base may be, for example, methylamine but preferably is an ionic hydroxide base, such as, tetrabutylammonium hydroxide, sodium hydroxide or potassium hydroxide in a solvent, such as, water and/or a lower alkanol, e.g., methanol or ethanol. This method of synthesizing said 2-($-COR''$) compounds forms the subject matter of copending U.S. patent application Ser. No. 5741 of Louis Cincotta and James W. Foley filed Nov. 2, 1978.

In addition to the aforementioned methods of preparing starting materials useful in the subject method, particular 2-substituted-3,3-disubstituted-2,3-dihydrobenz[d]isothiazole-1,1-dioxides useful as starting materials in the subject method are disclosed and claimed in copending U.S. patent applications Ser. Nos. 835,998 and 836,021 of Stanley M. Bloom, Alan L. Borror and James W. Foley filed Sept. 23, 1977; in copending U.S. patent application Ser. No. 836,067 of Alan L. Borror, Louis Cincotta, Ernest W. Ellis and James W. Foley filed Sept. 23, 1977; in copending U.S. patent application Ser. No. 836,005 of Stanley M. Bloom, Alan L. Borror and James W. Foley filed Sept. 23, 1977; and in copending U.S. patent application Ser. No. 957,163 of James W. Foley filed Nov. 2, 1978, which applications for convenience are incorporated herein.

The subject compounds where the R group of said

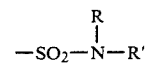

moiety is phenyl, unsubstituted or substituted with a solubilizing group, may be prepared from a phenol/1-naphthol sulfonephthalein wherein the functional —OH and other —OH groups that may be present are protected with a blocking group, such as, 2'-tetrahydropyranyl. For example, after "blocking" the —OH groups, the protected phenol/1-naphthol sulfonephthalein may be reacted with thionyl chloride or phosphorus pentachloride to give the corresponding sulfonyl chloride which is reacted with an alkyl or arylamine, $RNH_2$ wherein R has the same meaning given above, to give the corresponding sulfonamide. The sulfonamide is then reacted with the appropriate acylating agent, for example, ClR' wherein R' has the same meaning given above to give the leuco dye precursor, from which the protecting groups are removed, before it is oxidized, e.g., with o-chloranil to yield the dye product.

This reaction sequence is illustrated below using phenolsulfonephthalein blocked with a protecting group.

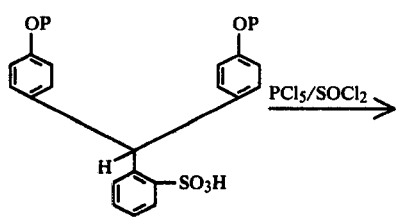
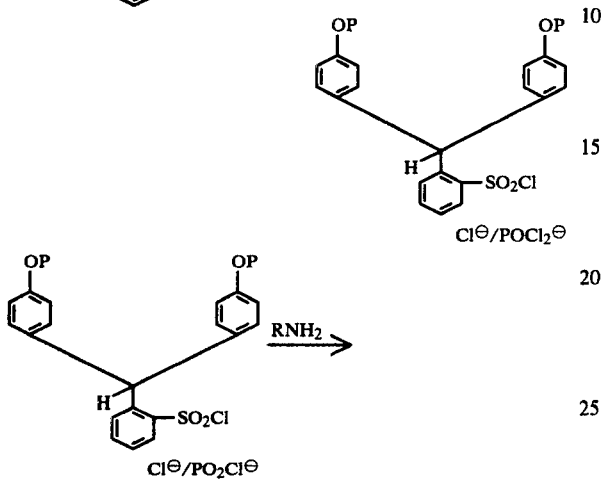
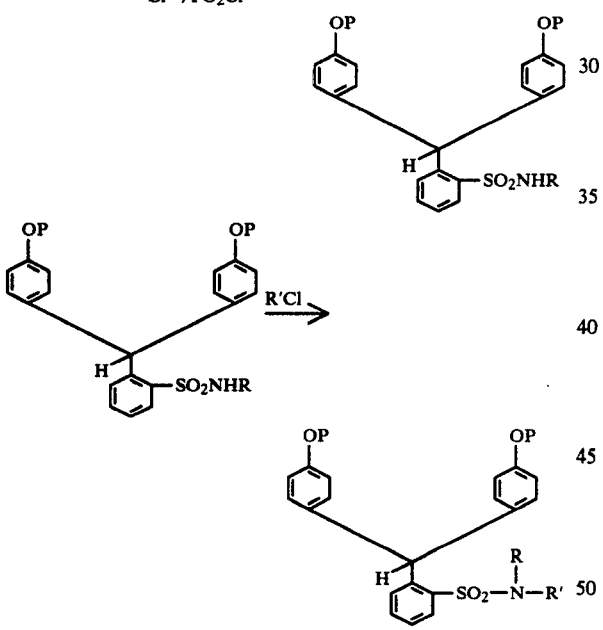
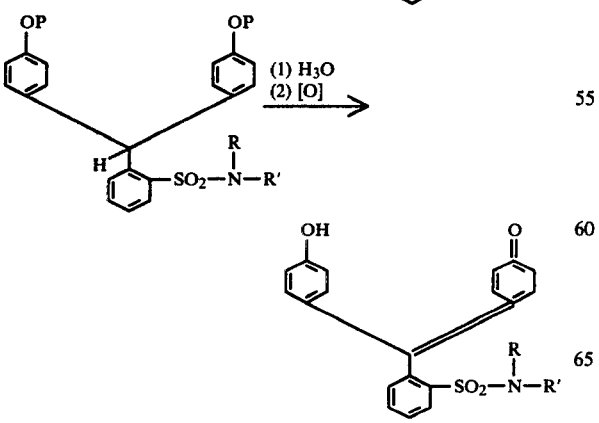

wherein R and R' in the foregoing sequence have the same meaning given above.

The following examples are given to further illustrate the present invention and are not intended to limit the scope thereof.

EXAMPLE 1

Preparation of the compound having the formula:

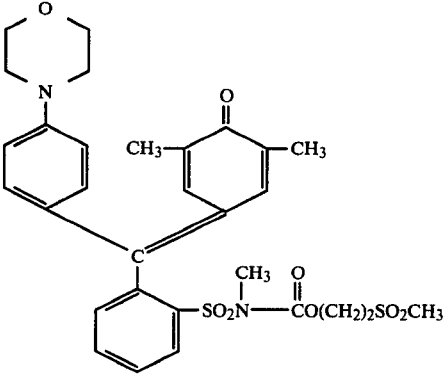

To 50 ml of water was added 0.23 g of potassium carbonate ($K_2CO_3$) and 1.0 g of 2-(—$CO_2CH_2CH_2SO_2CH_3$)-3-(3',5'-dimethyl-4'-hydroxy-1'-phenyl)-3-(4''-N-morpholinyl-1''-phenyl)-2,3-dihydrobenz[d]isothiazole-1,1-dioxide. To this red solution was added 50 ml of dichloromethane containing 2 ml of methyl iodide, and a two-phase system resulted. A 4% tetrabutylammonium chloride solution (21 mg) was added, and the mixture was stirred well for 48 hours, at which time the water layer was colorless and the dichloromethane layer was red. The dichloromethane was separated and washed with dilute $K_2CO_3$ solution, then with water and dried over sodium sulfate. The dichloromethane was evaporated to yield 1.02 g of red solid. The solid was recrystallized from 30 ml isopropanol to yield 0.75 g of red crystals. TLC using 9.5 ml ether/0.5 ml methanol on silica gel showed a trace of benz[d]isothiazole-1,1-dioxide starting material still present. The remaining red crystals (~0.65 g) were purified via medium pressure liquid chromatography (silica gel/ethyl acetate) to yield 0.5 g of the title compound.

EXAMPLE 2

Preparation of the compound having the formula:

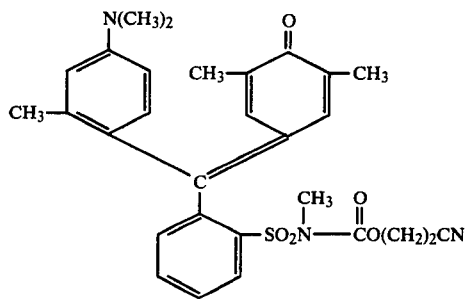

To 50 ml of water was added 0.16 g $K_2CO_3$ and 0.6 g of 2-(—$CO_2CH_2CH_2CN$)-3-(3',5'-dimethyl-4'-hydroxy-1'-phenyl)-3-(4''-N,N-dimethylamino-2''-methyl-1''-phenyl)-2,3-dihydrobenz[d]isothiazole-1,1-dioxide.

Then 50 ml of dichloromethane containing 3 ml methyl iodide was added, and a two-phase system resulted with the water layer being an intense red. To this well-stirred mixture was added 4% tetrabutylammonium chloride, and the reaction mixture was stirred for 16 hours. After stirring, the water layer became a light yellow and the dichloromethane layer was red. The dichloromethane layer was separated, washed with water, dried over sodium sulfate and evaporated to leave a red solid. TLC using 9.5 ml chloroform/0.5 ml methanol on silica gel showed three spots. The remaining red solid was placed on a column packed with silica gel, and elution with chloroform/methanol (9.5:0.5) solvent system gave the title compound.

EXAMPLE 3

Preparation of the compound having the formula:

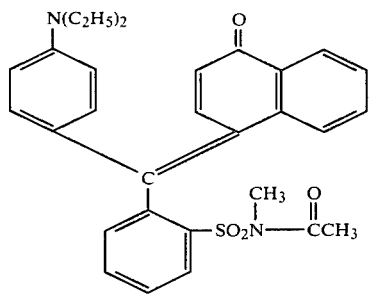

To 25 ml of water containing 0.027 g of $K_2CO_3$ was added 0.100 g of 2-(—$COCH_3$)-3-(4'-hydroxy-1'-naphthyl)-3-(4''-N,N-diethylamino-1''-phenyl)-2,3-dihydrobenz[d]isothiazole-1,1-dioxide. A blue solution resulted. 25 ml of dichloromethane was added along with 2 ml methyl iodide and a spatula tip of tetrabutylammonium chloride. With stirring, an immediate color change to magenta occurred and the water layer became colorless. (The dichloromethane layer contained the dye.) The reaction mixture was stirred overnight. TLC on silica gel with 7/3 ether/petroleum ether showed the reaction was complete. The dichloromethane layer was separated, dried and evaporated to dryness giving 0.100 g of the title compound as a red solid.

EXAMPLE 4

Preparation of the compound having the formula:

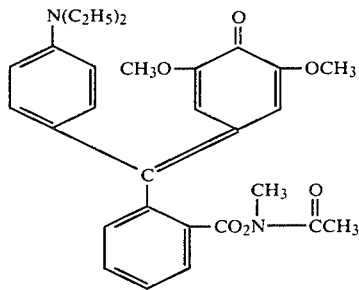

To 20 ml water at room temperature was added 0.0205 g $K_2CO_3$, 0.076 g of 2-(—$COCH_3$)-3-(3',5'-dimethoxy-4'-hydroxy-1'-phenyl)-3-(4''-N,N-diethylamino-1''-phenyl)-2,3-dihydrobenz[d]isothiazole-1,1-dioxide, 20 ml dichloromethane, 2 ml methyl iodide and a spatula tip of tetrabutylammonium hydroxide. The blue-colored water layer immediately became colorless and the dichloromethane layer became magenta colored. The reaction mixture was stirred overnight and the dichloromethane layer was separated, dried and evaporated to leave the title compound as a magenta solid. TLC on silica gel using 9.7 ml dichloromethane/0.3 ml methanol showed the product was homogeneous.

EXAMPLE 5

Preparation of the compound having the formula:

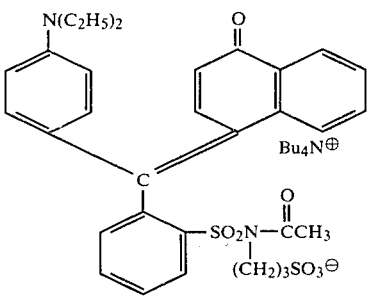

To a solution of 0.10 g of 2-(—$COCH_3$)-3-(4'-hydroxy-1'-naphthyl)-3-(4''-N,N-diethylamino-1''-phenyl)-2,3-dihydrobenz[d]isothiazole-1,1-dioxide dissolved in methanol was added 0.2 g of a 25% methanol solution of tetrabutylammonium hydroxide. The resulting solution was evaporated to dryness, the residue dissolved in 20 ml of tetrahydrofuran and 0.5 g of 1,3-propane sultone was added. The reaction mixture was refluxed overnight and the tetrahydrofuran removed under reduced pressure. The residue was dissolved in 2 ml chloroform, and employing preparative TLC techniques using silica gel and 9/1 ether/methanol, the product was isolated. The title compound was obtained as a purple hygroscopic solid.

EXAMPLE 6

Preparation of the compound having the formula:

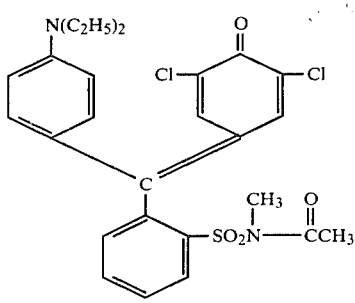

To 20 ml of water was added 0.266 g of 2-(—$COCH_3$)-3-(3',5'-dichloro-4'-hydroxy-1'-phenyl)-3-(4''-N,N-diethylamino-1''-phenyl)-2,3-dihydrobenz[d]isothiazole-1,1-dioxide along with 0.071 g $K_2CO_3$, 20 ml dichloromethane, 2 ml methyl iodide and a spatula tip of tetrabutylammonium chloride. The blue water solution became colorless and the dichloromethane layer was purple. The reaction mixture was stirred well overnight, the dichloromethane layer separated, dried over sodium sulfate and evaporated to leave a purple residue which crystallized on standing. The crystals were washed with ethanol and filtered. The ethanol filtrate was evaporated to give the title compound.

EXAMPLE 7

Preparation of the compound having the formula:

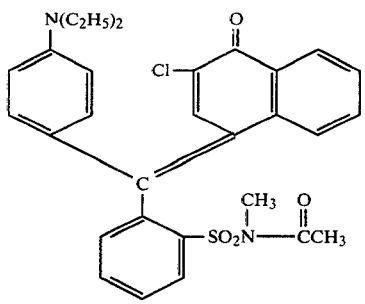

0.158 g of 2-(—COCH₃L).3-(3'-chloro-4'-hydroxy-1'-naphthyl)-3-(4''-N,N-diethylamino-1'''-phenyl)-2,3-dihydrobenz[d]isothiazole-1,1-dioxide, 20 ml water, 0.041 g K₂CO₃, 20 ml dichloromethane and 2 ml methyl iodide were stirred together. To this blue mixture was added a spatula tip of tetrabutylammonium chloride. The blue water solution immediately became colorless and the dichloromethane layer became purple. This reaction mixture was stirred overnight. TLC on silica gel with ether showed completion of the reaction. The dichloromethane layer was separated, dried over sodium sulfate and evaporated to leave 0.162 g of the title compound as a dark purple solid.

EXAMPLE 8

Preparation of the compound having the formula:

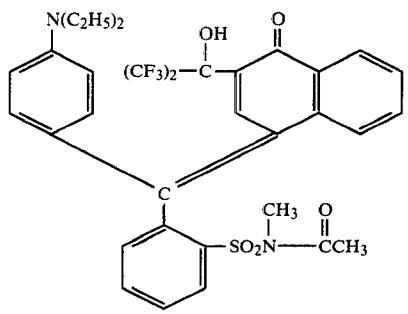

0.584 g of 2-(—COCH₃)-3-[(3'-α-hydroxy-α-trifluoromethyl-β,β,β-trifluoroethyl)-4'-hydroxy-1'-naphthyl]-3-(4''-diethylamino-1'''-phenyl)-2,3-dihydrobenz[d]isothiazole-1,1-dioxide, 0.12 g K₂CO₃, 25 ml water, 25 ml dichloromethane, 2 ml methyl iodide and one spatula tip of tetrabutylammonium chloride were stirred together. The blue water solution immediately turned colorless and the dichloromethane was blue. This reaction mixture was stirred for 16 hours. TLC on silica gel with ether showed that only a small amount of the desired reaction had occurred. One more spatula tip of tetrabutylammonium chloride was added along with more K₂CO₃. After stirring the reaction mixture overnight, TLC showed about 50% conversion. The title compound was purified using preparative TLC and obtained as a blue solid.

EXAMPLE 9

Preparation of the compound having the formula:

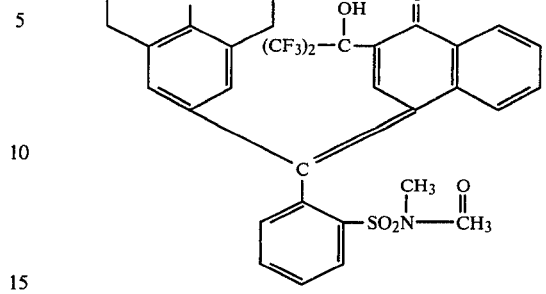

0.30 g of 2-(—COCH₃)-3-[3'-α-hydroxy-α-trifluoromethyl-β,β,β-trifluoroethyl)-4'-hydroxy-1'-naphthyl]-3-(9'-julolidinyl)-2,3-dihydrobenz[d]isothiazole-1,1-dioxide was placed in a flask with 25 ml dichloromethane, 25 ml water, 0.07 g (10% excess) K₂CO₃, 2 ml of methyl iodide and a spatula tip of tetrabutylammonium chloride. The dichloromethane layer was colored cyan. The reaction mixture was stirred rapidly overnight. The dichloromethane layer was separated, dried and evaporated. Using preparative TLC on a sample of the residue, the appropriate band was separated, washed with acetone and the acetone evaporated to yield the title compound as a cyan solid.

EXAMPLE 10

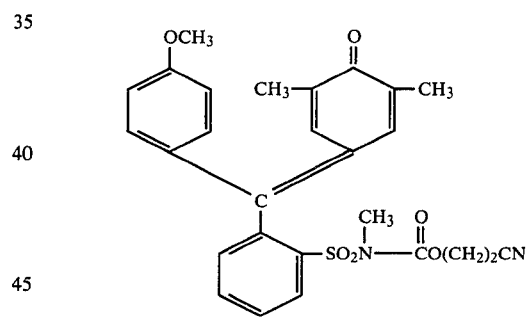

0.9 g of 2-(—CO₂CH₂CH₂CN)-3-(3',5'-dimethyl-4'-hydroxy-1'-phenyl)-3-(4''-methoxy-1'''-phenyl)-2,3-dihydrobenz[d]isothiazole-1,1-dioxide was placed in a flask with 20 ml water, 20 ml dichloromethane, 0.252 g K₂CO₃, 2 ml methyl iodide and a spatula tip of tetrabutylammonium chloride. This reaction mixture was stirred well overnight. TLC on silica gel with 8/2 ether/chloroform showed that the reaction was almost complete. The chloroform layer was then separated, dried over sodium sulfate and evaporated to leave a yellow solid. The yellow solid was dissolved in chloroform, placed on a column packed with silica gel with 8/2 ether/chloroform and eluted with chloroform. The appropriate fraction was collected and evaporated to yield the title compound as a yellow solid.

EXAMPLE 11

Preparation of the compound having the formula:

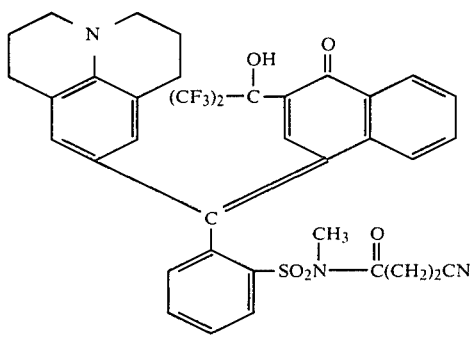

0.068 g of 2-(—CO₂CH₂CH₂CN)-3-[(3'-α-hydroxy--α-trifluoromethyl-β,β,β-trifluoroethyl)-4'-hydroxy-1'-naphthyl]-3-(9'-julolidinyl)-2,3-dihydrobenz[d]isothiazole-1,1-dioxide was dissolved in 20 ml dichloromethane and to this solution was added 0.013 g K₂CO₃, 20 ml water, 1 ml methyl iodide and a spatula tip of tetrabutylammonium chloride. The cyan color of the water layer transferred to the dichloromethane layer. This reaction mixture was stirred for 4 hours at room temperature. TLC on silica gel with ether showed the reaction was complete. The dichloromethane layer was separated, washed with water and dried over sodium sulfate to yield a blue solid on drying. Using preparative TLC on silica gel and eluting with ether, the cyan band was isolated and treated with acetone. The acetone was filtered and removed to yield the title compound as a cyan solid.

EXAMPLE 12

Preparation of the compound having the formula:

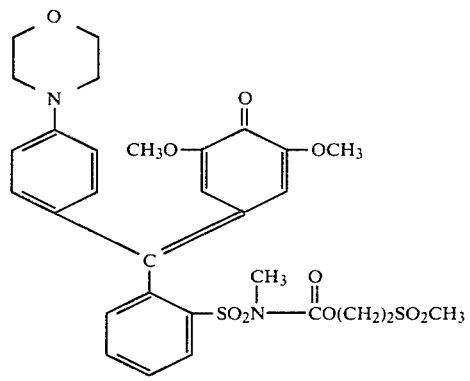

To 160 mg K₂CO₃ dissolved in 50 ml water was added 731 mg of 2-(—CO₂CH₂CH₂SO₂CH₃)-3-(3',5'-dimethoxy-4'-hydroxy-1'-phenyl)-3-(4''-N-morpholinyl-1''-phenyl)-2,3-dihydrobenz[d]-isothiazole-1,1-dioxide to give an intense red solution. To this solution was added 50 ml dichloromethane and 3 ml methyl iodide followed by a few milligrams of tetrabutylammonium chloride. This reaction mixture was stirred rapidly under nitrogen for 16 hours. The aqueous phase became substantially colorless and the dichloromethane layer was colored. The dichloromethane was separated, washed with two 100 ml portions of water, dried over sodium sulfate and filtered. The filtrate was evaporated to dryness and a sample of the residue was recrystallized from 45 ml of boiling isopropanol and dried at 50°–55° C. in vacuo overnight to give 460 mg of the title compound.

EXAMPLE 13

Preparation of the compound having the formula:

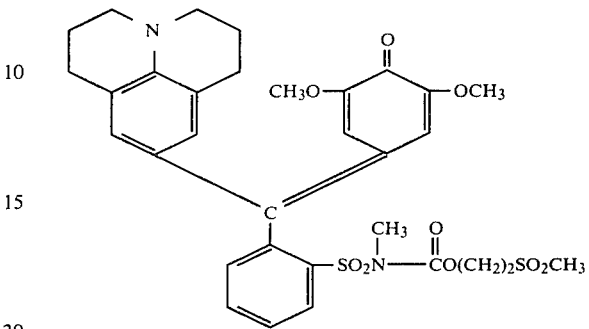

To 35 ml of dry tetrahydrofuran was added 2.82 g of 2-(—CO₂CH₂CH₂SO₂CH₃)-3-(3',5'-dimethoxy-4'-hydroxy-1'-phenyl)-3-(9'-julolidinyl)-2,3-dihydrobenz[d]isothiazole-1,1-dioxide followed by 304.3 mg of 85% potassium hydroxide (powdered). After stirring for 15 minutes, 5.6 ml of methyl iodide was added all at once, and then the reaction mixture was stirred at room temperature for 5 hours and poured into 350 ml water which contained 10 drops of 6 N HCl. The mixture was extracted with three 100 ml portions of chloroform and the combined chloroform extracts were washed with three 100 ml portions of water, saturated sodium chloride solution and dried over sodium sulfate overnight. The solvent was removed leaving a purple residue which was recrystallized from approximately 25 ml ethanol to give 1.8 g of crude product containing some starting material. The crude product was passed through a medium pressure liquid chromatography column eluted with 40/1 chloroform/methanol. The residue from the column was recrystallized from ethanol to yield 1.4 g of the title compound.

EXAMPLE 14

Preparation of the compound having the formula:

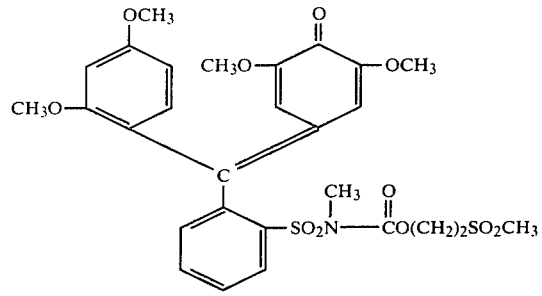

To 15 ml of dichloromethane was added 1.0 g of 2-(—CO₂CH₂CH₂SO₂CH₃)-3-(3',5'-dimethoxy-4'-hydroxy-1'-phenyl)-3-(2'',4''-dimethoxy-1''-phenyl)-2,3-dihydrobenz[d]isothiazole-1,1-dioxide. A solution of 115 mg K₂CO₃ in 15 ml water was then added followed by 937 mg of methyl iodide and 278 mg tetrabutylammonium chloride. The reaction mixture was stirred at room temperature for about 24 hours and transferred to a separatory funnel. The dichloromethane layer was separated, washed with water (3×25 ml), saturated sodium chloride solution (1×25 ml) and then dried over sodium sulfate. The solvent was removed under reduced pressure leaving 1.2 g of a red-orange oil. The oil was added to about 50 ml isopropanol, heated to solution and allowed to cool to room temperature. A yellow-orange solid precipitated. TLC showed small amounts of impurities. The remaining solid (780 mg) was redissolved in isopropanol with heating. The solution was allowed to cool to room temperature, and the yellow crystalline precipitate recovered to yield 600 mg of the title compound (melting range 145°–6° C.).

EXAMPLE 15

Preparation of the compound having the formula:

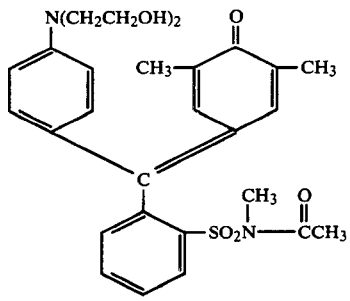

To 0.500 g of 2-(—COCH$_3$)-3-(3',5'-dimethyl-4'-hydroxy-1'-phenyl)-3-[4''-N,N-di($\beta$-hydroxyethyl)amino-1''-phenyl]-2,3-dihydrobenz[d]isothiazole-1,1-dioxide dissolved in 25 ml dichloromethane was added 10–12 ml water containing 0.131 g K$_2$CO$_3$. An intense violet-magenta color developed in the aqueous layer. Then 2 ml methyl iodide and a catalytic amount of n-tetrabutylammonium chloride (a spatula tip) were added, and the reaction mixture was stirred at room temperature overnight. TLC on silica gel, with 60/40 ethyl acetate/petroleum ether showed only a trace of a new colored spot. Stirring was continued at room temperature, and then an additional 4 ml methyl iodide and a small amount of the catalyst were added. The reaction was again stirred overnight, and TLC on silica gel in 60/40 ethyl acetate/petroleum ether showed some starting material and a spot below corresponding to the desired product. The solvent was removed leaving a dark maroon-magenta solid. The title compound was isolated using preparative TLC techniques with 80/20 ethyl acetate/petroleum ether solvent.

EXAMPLE 16

Preparation of the compound having the formula:

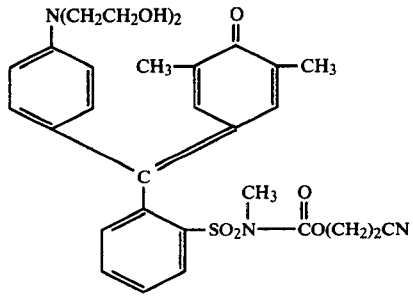

To 80–100 ml dichloromethane was added 0.691 g of 2-(—CO$_2$CH$_2$CH$_2$CN)-3-(3',5'-dimethyl-4'-hydroxy-1'-phenyl)-3-[4''-N,N-di($\beta$-hydroxyethyl)amino-1''-phenyl]-2,3-dihydrobenz[d]isothiazole-1,1-dioxide.

Then 50 ml water containing 0.168 g K$_2$CO$_3$ was added. A deep magenta-violet color developed in the aqueous layer. The mixture was stirred vigorously, and 6 ml methyl iodide was added together with 45 mg of tetrabutylammonium bromide. This reaction mixture was stirred vigorously overnight. The aqueous phase lost most of its deep magenta-violet color and the organic phase became orange-yellow. TLC on silica gel with 85/15 ethyl acetate/acetone showed one major red-magenta spot and a trace of starting material and other minor spots. The organic dichloromethane phase was decanted and the aqueous phase washed with several portions of dichloromethane which were combined with the organic phase. The combined organic phase was washed with three portions of water and then the solvent was removed under reduced pressure to give a maroon-bronze tar, which upon drying under vacuum, gave glistening maroon-bronze solid particles. This solid was purified via medium pressure column chromatography (silica gel using 85/15 ethyl acetate/acetone solvent). The dark red maroon elutant was collected and the solvent removed to yield 0.6 g of the title compound.

EXAMPLE 17

Preparation of the compound having the formula:

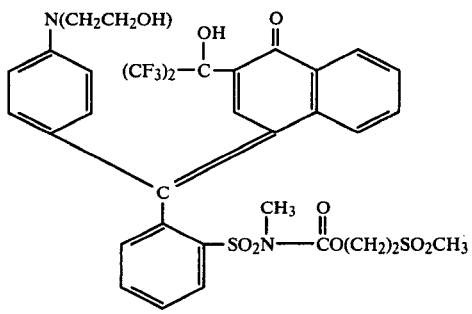

(a) To 1.9 g of 2-(—CO$_2$CH$_2$CH$_2$SO$_2$CH$_3$)-3-[(3'-$\alpha$-hydroxy-$\alpha$-trifluoromethyl-$\beta$,$\beta$,$\beta$-trifluoroethyl)-4'-hydroxy-1'-naphthyl]-3-[4''-N,N-di($\beta$-2''-tetrahydropyranyloxyethyl)-1''-phenyl]-2,3-dihydrobenz[d]isothiazole-1,1-dioxide dissolved in 25–30 ml N,N-dimethylformamide was added 1.5 ml methyl iodide and 0.15 g of powdered 85% potassium hydroxide. This reaction mixture was stirred vigorously for 3 to 4 hours at room temperature. TLC on silica gel with 80/20 ethyl acetate/acetone (or pure ethyl acetate) showed no starting material present. The reaction mixture was then poured into cold water containing a small amount of HCl and overlayered with ethyl acetate. The water was decanted and the ethyl acetate washed several times with water. Then the solvent was removed leaving a blue solid which was dissolved in 20 ml ethyl acetate and placed on a low pressure liquid chromatography column using 80/20 ethyl acetate/hexane as the solvent. The blue portion was collected, the solvent removed and the residue dried under vacuum giving 0.340 g of solid.

(b) The product of step (a) (0.340 g) was dissolved in 35–40 ml methanol, and then 4 drops of conc. HCl were added. The solution was heated gently on a steam bath for approximately 15 minutes, poured into cold water containing some sodium chloride and extracted with ethyl acetate. The ethyl acetate was dried over anhydrous sodium sulfate in the presence of some activated carbon and filtered. The solvent was removed, and the residue dried under vacuum to yield 0.214 g of the title compound.

EXAMPLE 18

Preparation of the compound having the formula:

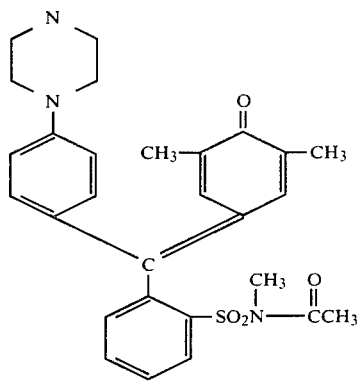

A solution of approximately 2.0 g of 2-(—COCH$_3$)-3-(3',5'-dimethyl-4'-hydroxy-1'-phenyl)-3-(4"-N-morpholinyl-1"-phenyl)-2,3-dihydrobenz[d]isothiazole-1,1-dioxide dissolved in 100 ml dichloromethane was added to a solution of 0.28 g K$_2$CO$_3$ dissolved in 200 ml water. To this mixture was added 0.22 g of tetrabutylammonium chloride and 17.2 ml of methyl iodide. This two-phase reaction mixture was stirred for 18 hours. TLC showed some starting material still present. Additional K$_2$CO$_3$ (a small spatula full) was added together with an additional 2 ml of methyl iodide. The reaction mixture was then stirred for 5 hours with no apparent change in the TLC. The organic dichloromethane layer was separated from the aqueous layer, washed with 300 ml water and the dichloromethane removed under reduced pressure to yield 1.06 g of a dark orange solid. The solid was dissolved in 10 ml chloroform and placed on a medium pressure liquid chromatography column (silica gel) and eluted with 8/2 ethyl acetate/hexane to give 0.50 g of the title compound.

EXAMPLE 19

Preparation of the compound having the formula:

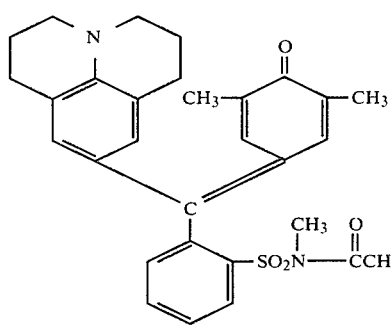

(a) To a solution of 0.67 g of 2-(—COCH$_3$)-3-(3',5'-dimethyl-4'-methoxymethoxy-1'-phenyl)-3-(9'-julolidinyl)-2,3-dihydrobenz[d]isothiazole-1,1-dioxide dissolved in 50 ml methanol was added two drops of conc. HCl. The solution was refluxed on a steam bath for one-half hour. TLC showed no starting material present. The methanol was removed leaving an oil. The oil was dissolved in dichloromethane and washed three times with water.

(b) The dichloromethane solution of step (a) was added to a solution of 0.3 g K$_2$CO$_3$ and 0.2 g tetrabutylammonium chloride dissolved in 40 ml water. To this two-phase system was added 0.5 ml methyl iodide and the reaction mixture was stirred for 16 hours. TLC showed that the reaction was complete. The organic layer was separated and washed three times with water, dried and the dichloromethane evaporated to give a violet oil. The oil was placed on a column of silica gel (100-200 mesh) and eluted with a solution of 7/3 ether acetate/hexane to give a pure sample of the title compound.

EXAMPLE 20

Preparation of the compound having the formula:

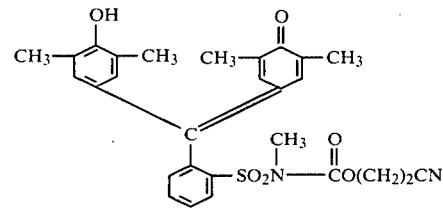

To a solution of 0.55 g of 2-(—CO$_2$CH$_2$CH$_2$CN)-3-(3',5'-dimethyl-4'-hydroxy-1'-phenyl)-3-(3",5"-dimethyl-4"-methoxymethoxy-1"-phenyl)-2,3-dihydrobenz[d]isothiazole-1,1-dioxide dissolved in 60 ml dichloromethane was added a solution of 0.2 g K$_2$CO$_3$ in 60 ml water along with a small amount (catalytic amount) of tetrabutylammonium chloride and 2 ml of methyl iodide. This reaction mixture was stirred for 4 hours at room temperature, then washed several times with water and the organic dichloromethane layer separated and evaporated to give 0.68 g of a yellow solid. The solid was dissolved in methanol containing one drop of conc. HCl and the solution heated at reflux for 20 minutes. The methanol was removed leaving a red-orange residue. Using preparative TLC techniques, 0.12 g of the title compound was recovered from the residue.

EXAMPLE 21

Preparation of the compound having the formula:

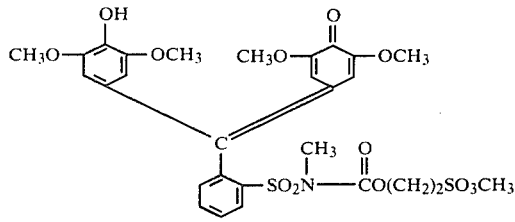

To 5.7 g of 2-(—CO$_2$CH$_2$CH$_2$SO$_2$CH$_3$)-3-(3',5'-dimethoxy-4'-hydroxy-1'-phenyl)-3-(3",5"-dimethoxy-4"-hydroxy-1"-phenyl)-2,3-dihydrobenz[d]isothiazole-1,1-dioxide dissolved in 50 ml of dry N,N-dimethylformamide was added 0.66 g of 85% powdered potassium hydroxide. Then 10 ml of methyl iodide was slowly added at room temperature, and the dark green-yellow reaction mixture was stirred for 4 hours. (After 2 hours, the reaction mixture was orange in color and contained small amounts of suspended KOH.) Another 0.5 ml of methyl iodide was added and after an additional 2 hours, the TLC looked the same. The reaction mixture was then poured into 400 ml water containing 1 drop of conc. HCl and about 5 g of sodium chloride. The water was decanted from the oil, and the oil dissolved in dichloromethane and dried over sodium sulfate. The solution was evaporated under high vacuum to yield 6.6 g of an orange oil. The oil was heated in 200 ml methanol and a solid formed. The solid was recrystallized from dichloromethane/hexane to give 3.50 g of the title compound (melting range 184°–186° C.).

EXAMPLE 22

Preparation of the compound having the formula:

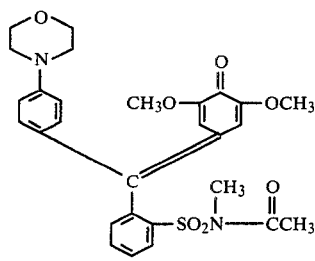

To a solution of 0.3 g of 2-(—COCH₃)-3-(3′,5′-dimethoxy-4′-hydroxy-1′-phenyl)-3-(4″-N-morpholinyl-1″-phenyl)-2,3-dihydrobenz[d]isothiazole-1,1-dioxide dissolved in 10 ml dichloromethane was added a solution of 0.1 g of K₂CO₃ in 10 ml water and a few crystals of tetrabutylammonium chloride. This mixture was stirred at room temperature and 1 ml of methyl iodide was added. The reaction mixture was stirred for a total of 24 hours, and an additional 0.5 ml methyl iodide was added after 8 hours. (No change in TLC was observed.) The dichloromethane layer was separated, washed with water, dried over sodium sulfate and evaporated. The residue yielded 0.07 g of the title compound using preparative TLC techniques with 3% methanol-dichloromethane solvent.

EXAMPLE 23

Preparation of the compound having the formula:

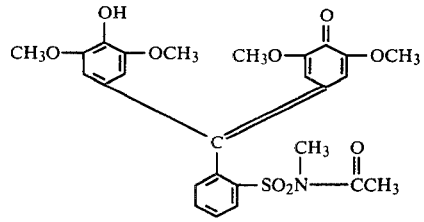

To a solution of 2.82 g of 2-(—COCH₃)-3-(3′,5′-dimethoxy-4′-hydroxy-1′-phenyl)-3-(3″,5″-dimethoxy-4″-hydroxy-1″-phenyl)-2,3-dihydrobenz[d]isothiazole-1,1-dioxide dissolved in 30 ml dry N,N-dimethylformamide was added 0.36 g of powdered 85% potassium hydroxide and 4 ml of methyl iodide. This reaction mixture was stirred at room temperature for 2 hours changing from a very dark green to a light yellow-orange. (TLC showed a large amount of starting material present.) An additional 3 ml of methyl iodide and a small amount of potassium hydroxide were added and the reaction mixture was stirred for another 16 hours. Then the reaction mixture was poured into 200 ml water acidified with 3 drops of conc. HCl, extracted with chloroform, dried and evaporated to give a yellow oil. The yellow oil was placed on a medium pressure column of silica and eluted with 1:1 hexane-acetone to yield 0.43 g of the title compound.

EXAMPLE 24

Preparation of the compound having the formula:

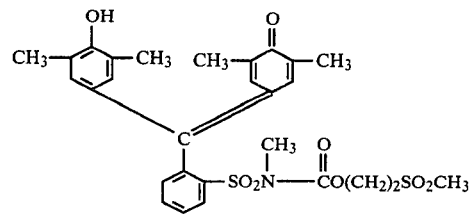

1.73 g of 2-(—CO₂CH₂CH₂SO₂CH₃)-3-(3′,5′-dimethyl-4′-hydroxy-1′-phenyl)-3-(3″,5″-dimethyl-4″-hydroxy-1″-phenyl)-2,3-dihydrobenz[d]isothiazole-1,1-dioxide was dissolved in 25 ml dry N,N-dimethylformamide along with 0.23 g of powdered 85% potassium hydroxide and 4 ml of methyl iodide. This reaction mixture was stirred for 3 hours at room temperature, then poured into water containing 1 drop of conc. HCl and extracted with dichloromethane. The dichloromethane was dried and evaporated to give an orange oil. The oil was dissolved in hot ethanol and upon cooling, a pale yellow impurity precipitated. The mother liquor was evaporated leaving an oil which was placed on a medium pressure column (silica) and eluted with dichloromethane to give 0.94 g of the title compound.

EXAMPLE 25

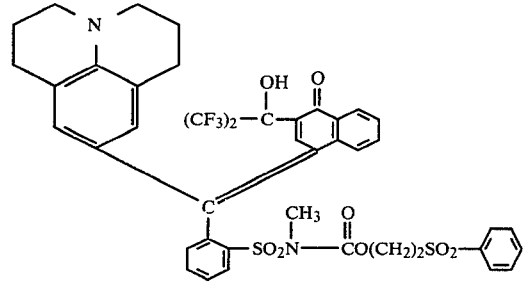

To a solution of 3.8 g of 2-(—CO₂CH₂CH₂SO₂—⟨ ⟩)-3-[(3′-α-hydroxy-α-trifluoromethyl-β,β,β-trifluoroethyl)-4′-hydroxy-1′-naphthyl]-3-(9′-julolidinyl)-2,3-dihydrobenz[d]-isothiazole-1,1-dioxide dissolved in 100 ml of dry tetrahydrofuran was added 0.21 g of a 50% oil dispersion of sodium hydride and 5 ml of methyl iodide. This reaction mixture was stirred in the dark for 48 hours at room temperature under nitrogen. TLC on silica gel with ether showed the reaction was complete. The reaction mixture was poured into 1 liter of water containing 5 ml of conc. HCl, extracted with ether and the ether was dried over sodium sulfate and evaporated. The residue was dissolved in 20 ml of dichloromethane and placed on a medium pressure column and eluted with ether until the appropriate band was removed. The solvent was evaporated to yield 1.135 g of the title compound.

EXAMPLE 26

Preparation of the compound having the formula:

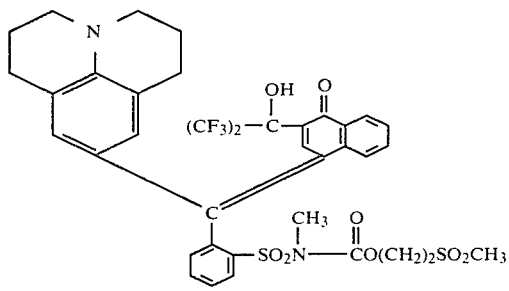

To 3.25 g of 2-(—CO$_2$CH$_2$CH$_2$SO$_2$CH$_3$)-3-[(3'-α-hydroxy-α-trifluoromethyl-β,β,β-trifluoroethyl)-4'-hydroxy-1'-naphthyl]-3-(9'-julolidinyl)-2,3-dihydrobenz[d]isothiazole-1,1-dioxide dissolved in 100 ml of tetrahydrofuran was added 0.2 g of a 50% sodium hydride oil dispersion under nitrogen at room temperature. To this mixture was added 5 ml of methyl iodide, and the reaction mixture was stirred for 48 hours in the dark. TLC on silica gel with ether showed many spots but one major product. The reaction mixture was then poured into one liter of water containing 5 ml of conc. HCl and extracted with ether. The ether was dried over sodium sulfate and evaporated. The blue residue was dissolved in 15 ml dichloromethane and placed on a medium pressure column and eluted with ether and then 100 ml 1%, 2%, 3%, 4% methanol in ether. The remaining elution employed the 4% methanol in ether until the product was removed. TLC still showed traces of impurities. The 0.537 g of product obtained was placed on a medium pressure column and eluted as above to give 0.48 g of pure title compound.

The compound of Example 26 also was prepared as follows:

To a three-necked, 250 ml flask equipped with a mechanical stirrer and nitrogen inlet tube was added in the dark 18 g of 2-(—CO$_2$CH$_2$CH$_2$SO$_2$CH$_3$)-3-[3'-α-hydroxy-α-trifluoromethyl-β,β,β-trifluoroethyl)-1'-naphthyl]-3-(9'-julolidinyl)-2,3-dihydrobenz[d]isothiazole-1,1-dioxide to 80 ml of dry dimethyl sulfoxide. To this solution was added with mechanical stirring at room temperature, 12 ml of methyl iodide. Finally, 1.9 g of powdered 85% potassium hydroxide pellets were added. After stirring the mixture for one hour in the dark, TLC on silica gel with 1/9 methanol/ether showed the reaction was complete. The reaction solution was poured into 5 liters of water containing 6 ml of conc. HCl. The blue precipitate was collected by vacuum filtration on a Büchner funnel and washed well with water. The precipitate was pressed dry, dissolved in 600 ml of hot methanol, filtered and cooled to room temperature. The product separated as green crystals. These were filtered and vacuum dried to give 7.1 g of product which gave a single spot on TLC. The mother liquor was concentrated to near dryness on a rotary evaporator. The residue was dissolved in 50 ml of acetone to which 500 ml of ethyl ether was then added. An impurity which precipitated was removed by filtering through a celite pad. The ether solution was evaporated to dryness. The residue was again crystallized from methanol (75 ml) to give a second crop of the title compound (2.7 g) for a total of 9.8 g (53% yield).

EXAMPLE 27

Preparation of the compound having the formula:

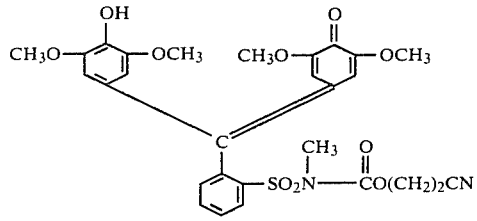

To 0.057 g of 2-(—CO$_2$CH$_2$CH$_2$CN)-3-(3',5'-dimethoxy-4'-hydroxy-1'-phenyl)-3-(3'',5''-dimethoxy-4''-hydroxy-1''-phenyl)-2,3-dihydrobenz[d]isothiazole-1,1-dioxide dissolved in 5 ml of acetone was added 0.014 g of powdered 85% potassium hydroxide and 0.01 ml of methyl iodide. This reaction mixture was refluxed for 3 hours excluding air. TLC on silica gel with 15% methanol/ether showed several spots including a small amount of starting material. The reaction mixture was poured into acidic water, extracted with ether and the ether evaporated under vacuum to yield an orange residue. The residue was dissolved in dichloromethane and the title compound was recovered by preparative TLC.

EXAMPLE 28

Preparation of the compound having the formula:

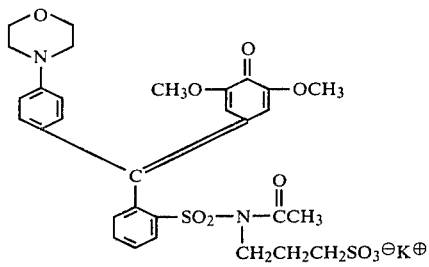

To a 200 mg (0.38 mM) sample of 2-(—COCH$_3$)-3-(3',5'-dimethoxy-4'-hydroxy-1'-phenyl)-3-(4''-N-morpholinyl-1''-phenyl)-2,3-dihydrobenz[d]isothiazole-1,1-dioxide in 2 ml of dimethylformamide was added 20 mg (0.38 mM) of powdered potassium hydroxide under a nitrogen atmosphere. After the potassium hydroxide dissolved, 0.66 ml (7.63 mM) of propane sultone was added to the maroon solution at room temperature. TLC analysis indicated that the reaction was about half complete after two hours of stirring. The reaction mixture was concentrated under vacuum with heat to give a maroon solid. This material was dissolved in methanol and added to ethyl ether, which caused the product to precipitate. After preparative TLC (silica gel/methanol-ethyl acetate—1:5), the title compound was obtained as dark solid (green reflex).

EXAMPLE 29

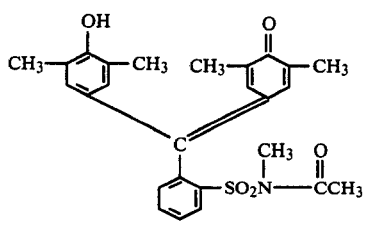

(a) To a solution of 0.40 g of 2-(—COCH₃)-3-(3',5'-dimethyl-4'-hydroxy-1'-phenyl)-3-(3",5"-dimethyl-4"-methoxymethoxy-1"-phenyl)-2,3-dihydrobenz[d]isothiazole-1,1-dioxide dissolved in 20 ml of dichloromethane was added 0.11 g of K₂CO₃ and 20 ml water. Then a catalytic amount of tetrabutylammonium chloride (a spatula tip) was added together with 2 ml of methyl iodide. The aqueous layer was violet and the organic dichloromethane layer was yellow. After stirring several hours, the aqueous layer became colorless and the dichloromethane was a deep yellow. The dichloromethane layer was then separated, washed with an equal volume of water, dried briefly over sodium sulfate, filtered and evaporated under reduced pressure leaving 530 mg of an orange syrup. The syrup was fractionated using preparative TLC (silica gel eluted with ether). 180 mg of the N-methylated compound was obtained as an orange-yellow syrup, which crystallized when covered with methanol.

(b) The compound prepared in step (a) (0.18 g) was dissolved in 50 ml methanol and heated to reflux in an oil bath. All of the solid dissolved, and after about 15 minutes, 2 drops of conc. HCl were added. Refluxing of the resulting wine red solution was continued for about one hour and then the solution was evaporated under reduced pressure to give a red film with a metallic green luster. The red film was dissolved in methanol, the methanol evaporated and the residue dried under reduced pressure in a warm water bath to give 140 mgs of the title compound as a red solid.

EXAMPLE 30

Preparation of the compound having the formula:

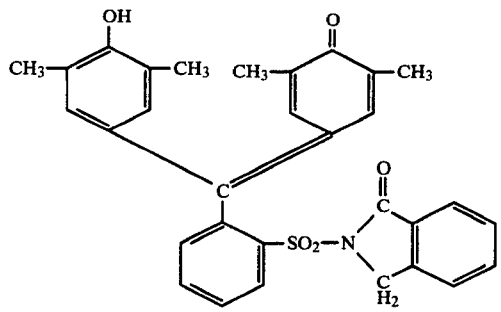

(a) To 1.5 g of

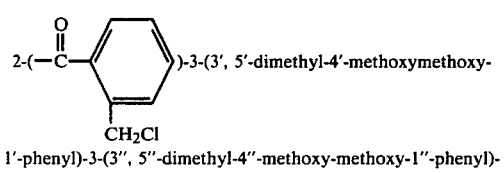

1'-phenyl)-3-(3", 5"-dimethyl-4"-methoxy-methoxy-1"-phenyl)-2,3-dihydrobenz[d]isothiazole-1,1-dioxide suspended in 60 ml methanol was added 3 drops of conc. HCl and the resulting mixture was heated at reflux for 20 minutes. The red colored solution was cooled and evaporated to give 1.5 g of the deblocked isothiazole-1,1-dioxide as a red solid.

(b) The red solid was dissolved in 60 ml methanol and 0.5 g of K₂CO₃ in 10 ml water was added dropwise. This reaction mixture was stirred for one hour at room temperature and then the pH of the mixture was adjusted to 5 with 1 N HCl. The solid that formed was collected and washed in refluxing ethanol for 40 minutes to yield the title compound as a yellow solid.

The irreversible cleavage reaction for the subject compounds wherein R and R' are taken separately has been illustrated above. The compounds wherein R and R' are taken with $$-\overset{|}{N}-$$

such as the compound prepared in Example 30, undergo an irreversible cleavage reaction with base to give a new colorless product as shown below wherein the A moiety is 4'-hydroxy-1'-phenyl and the B moiety is 4'-oxo-1'-phenylidene.

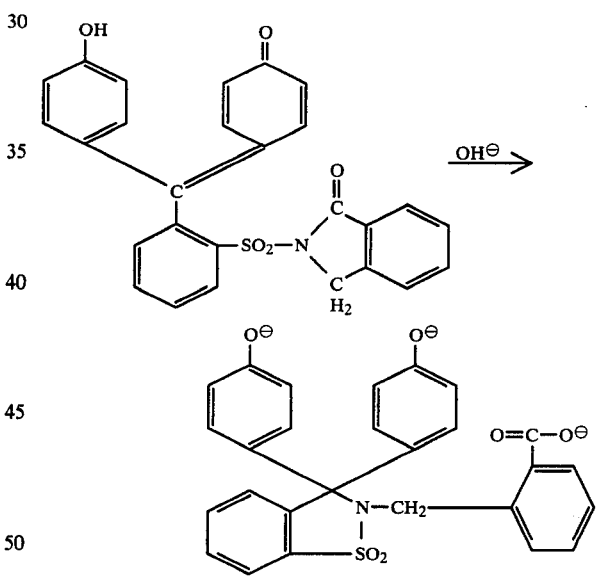

As noted previously, the compounds of the present invention are useful in photographic products and processes, e.g., as light-screening dyes, for example, antihalation or color correction filter dyes and may be employed in a conventional manner in the appropriate layer or layers of a photosensitive film unit. The use of the subject compounds in photographic products and processes is disclosed and claimed in copending U.S. patent application Ser. No. 106,520 of James W. Foley filed concurrently herewith. For convenience, the specification of this application is specifically incorporated herein.

As discussed above and also in the aforementioned application, the subject compounds have the ability to decolorize completely and irreversibly in base by undergoing an irreversible cleavage reaction within a predetermined time at a predetermined pH to give a new colorless compound which remains colorless at the pH's normally encountered during processing subsequent to "bleaching" so that the new compound may be retained in a photographic film unit, e.g., a photosensitive element without the possibility of color reappearing in time. In this regard, samples of the compounds prepared in Examples 24 and 26 above were dissolved in a small amount of methanol, and aqueous 1 N sodium hydroxide was added to each solution to decolorize the compound. After decolorization, aqueous hydrochloric acid was added to each solution to lower the pH to pH 1, and it was observed that both solutions remained colorless even at pH 1.

Also, the "bleaching" rates for the compounds of Examples 21, 23 and 24 were determined at pH=12 in terms of $T\frac{1}{2}$. By $T\frac{1}{2}$ is meant the time measured for one-half of the colored compound to decolorize. In making these determinations, a cell containing about 3 ml of pH=12 buffer (aqueous) was placed in a visible spectrometer. A sample of each compound was dissolved in methanol, and a small amount (less than 0.1 cc) of each solution was injected into the buffer. The optical densities were then recorded at a selected wavelength value to determine $T\frac{1}{2}$. The results are set forth below.

| Compound Ex. No. | Wavelength (λmax-nm) | $T\frac{1}{2}$ (pH = 12) (sec.) |
|---|---|---|
| 21 | 640 | 2 |
| 23 | 640 | 158 |
| 24 | 590 | 2 |

Also, it was observed that a methanol solution of the compound of Example 9, when added to aqueous 1 N KOH, decolorized in approximately 5 seconds and that a methanol solution of the compound of Example 26, when added to aqueous 1 N KOH, decolorized substantially instantaneously.

Using appropriate solvents, samples of the dye compounds prepared in Examples 12, 13, 24 and 26 were incorporated into the image-receiving layer 3 of four image-receiving components comprising the structure set forth below by mixing the solution of each compound with a solution of the graft copolymer and coating this mixture on top of the timing layer to complete each of the image-receiving components.

A transparent 4 mil polyethylene terephthalate film base coated with, in succession:

1. as a polymeric acid layer, a mixture of about 9 parts of a partial butyl ester of polyethylene/maleic anhydride copolymer and 1 part of polyvinyl butyral coated at a coverage of about 2,500 mgs./ft.$^2$;
2. a timing layer containing a 14:1 ratio of a 60-30-4-6 tetrapolymer of butylacrylate, diacetone acrylamide, styrene and methacrylic acid and polyvinyl alcohol at a coverage of 500 mgs./ft.$^2$;
3. a graft copolymer of 4-vinylpyridine and vinylbenzyltrimethylammoniumchloride grafted on hydroxyethyl cellulose in a weight ratio of 2.2/1/2.2, respectively, coated at a coverage of 300 mgs./ft.$^2$ to provide an imagereceiving layer and containing the selected dye compound at a coverage of 22 mgs./ft.$^2$.

Each of the image-receiving components containing the respective dye compounds were placed on a piece of gelatin coated Mylar, and the transmission densities for red (R), green (G) and blue (B) were recorded on a transmission densitometer. Then several drops of aqueous 1 N KOH were added to each gelatin sheet, and the image-receiving components were lightly pressed against the gelatin sheets to "bleach" the dye compounds. After 15 to 60 seconds, the transmission densities were again recorded for red (R), green (G) and blue (B) for each "sandwich". The results are set forth below.

| Compound Ex. No. | Transmission Densities** | | | | | |
|---|---|---|---|---|---|---|
| | Before Bleaching | | | After Bleaching | | |
| | R | G | B | R | G | B |
| 12 | .00 | .31 | .45 | .02 | .01 | .00 |
| 13 | .21 | .32 | .09 | .01 | .01 | .00 |
| 24 | .00 | .00 | .40 | .01 | .00 | .00 |
| 26* | .19 | .06 | .05 | .02 | .00 | .02 |

*Measurements made on coating stored for over 3 months; bleaching time was about 3 minutes.
**The densitometer was set at 0.00 for R, G, B with two pieces of gelatin coated mylar in the light beam.

In addition to their utility as photographic light-screening dyes, the subject compounds may be used as a means for detecting the presence of alkali and also may be used in a validation or verification system, e.g., for documents by using their ability to decolorize within a predetermined time at a predetermined alkaline pH. For the latter and other related uses, the subject dyes may be employed to provide a particular pattern or symbol by treating a layer of the dye with an aqueous alkaline solution applied in an imagewise fashion to give the desired pattern or configuration.

Since certain changes may be made in the above product and processes without departing from the scope of the invention herein involved, it is intended that all matter contained in the above description shall be interpreted as illustrative and not in a limiting sense.

What is claimed is:

1. A compound of the formula

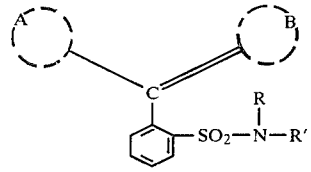

wherein A is a phenyl moiety or a naphthyl moiety; B is a 4'-oxo-1'-phenylidene moiety or a 4'-oxo-1'-naphthylidene moiety; R is an alkyl group containing 1 to 4 carbon atoms or a phenyl group, unsubstituted or substituted with a solubilizing group selected from —SO$_3$H, —COOH and —OH; R' is selected from

wherein R'' is methyl, unsubstituted or substituted with one or two halo groups or substituted with a phenyl, alkoxy containing 1 to 4 carbon atoms or phenoxy group and

16. A compound as defined in claim 9 wherein said R is said alkyl.
17. A compound as defined in claim 9 wherein said R' is said
18. A compound as defined in claim 9 wherein said R' is said
19. A compound as defined in claim 9 wherein said R and R' are taken together and represent
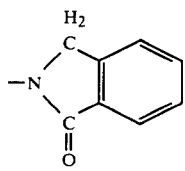
20. The compound
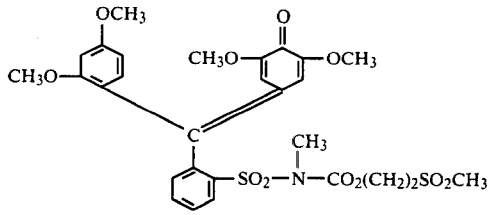
21. The compound
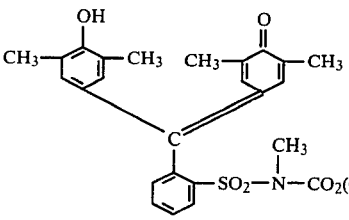
22. The compound
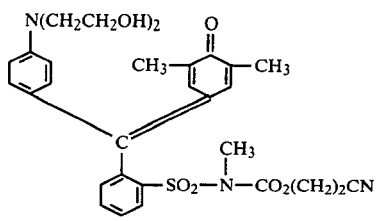
23. The compound
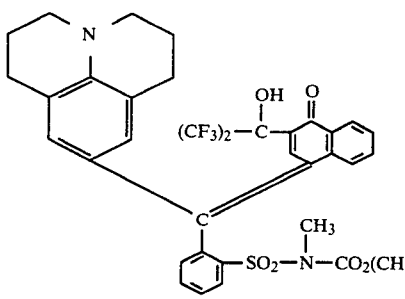
* * * * *